(12) United States Patent
Wang et al.

(10) Patent No.: US 12,347,148 B2
(45) Date of Patent: Jul. 1, 2025

(54) IMAGE PROCESSING METHOD AND RELATED DEVICE

(71) Applicant: Huawei Technologies Co., Ltd., Shenzhen (CN)

(72) Inventors: Jing Wang, Beijing (CN); Ze Cui, Beijing (CN); Bo Bai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 17/881,432

(22) Filed: Aug. 4, 2022

(65) Prior Publication Data
US 2022/0375133 A1    Nov. 24, 2022

Related U.S. Application Data

(63) Continuation of application No. PCT/CN2021/075405, filed on Feb. 5, 2021.

(30) Foreign Application Priority Data

Feb. 7, 2020 (CN) .......................... 202010082808.4

(51) Int. Cl.
*G06K 9/00*        (2022.01)
*G06T 3/4007*      (2024.01)
(Continued)

(52) U.S. Cl.
CPC .............. *G06T 9/00* (2013.01); *G06T 3/4007* (2013.01); *G06V 10/48* (2022.01)

(58) Field of Classification Search
CPC .......... G06T 9/00; G06T 3/4007; G06V 10/48
See application file for complete search history.

(56) References Cited

U.S. PATENT DOCUMENTS

2018/0174052 A1*  6/2018  Rippel ................. G06V 40/172
2018/0316931 A1   11/2018  Ho et al.
(Continued)

FOREIGN PATENT DOCUMENTS

CN       102186076 A     9/2011
CN       102378991 A     3/2012
(Continued)

OTHER PUBLICATIONS

Neural Image Compression via Non-Local Attention Optimization and Improved Context Modeling, Tong Chen et al., arXiv, 2019, pp. 1-13 (Year: 2019).*
(Continued)

*Primary Examiner* — Jayesh A Patel
(74) *Attorney, Agent, or Firm* — Leydig, Voit & Mayer, Ltd.

(57) ABSTRACT

An image processing method and apparatus are provided. The method includes: obtaining an image; performing feature extraction on the image to obtain at least one first feature map, wherein the at least one first feature map includes N first feature values, and N is a positive integer; obtaining a target compression bit rate which corresponds to M target gain values, each target gain value corresponds to one first feature value, and M is a positive integer less than or equal to N; respectively processing corresponding first feature values based on the M target gain values to obtain M second feature values; and performing quantization and entropy encoding on at least one processed first feature map to obtain encoded data, wherein the at least one processed first feature map includes the M second feature values. According to the application, compression bit rate control is implemented in a same compression model.

17 Claims, 18 Drawing Sheets

(51) Int. Cl.
    *G06T 9/00*     (2006.01)
    *G06V 10/48*     (2022.01)

(56) References Cited

U.S. PATENT DOCUMENTS

| | | | |
|---|---|---|---|
| 2019/0132591 | A1 | 5/2019 | Zhang et al. |
| 2019/0266490 | A1* | 8/2019 | Rippel .................. G06N 20/00 |
| 2019/0342551 | A1* | 11/2019 | Zhu ....................... H04W 24/02 |
| 2020/0027247 | A1* | 1/2020 | Minnen ................... G06F 17/18 |
| 2020/0252611 | A1* | 8/2020 | Li .......................... H04N 19/124 |
| 2022/0224926 | A1 | 7/2022 | Lu et al. |

FOREIGN PATENT DOCUMENTS

| | | | |
|---|---|---|---|
| CN | 103903271 | A | 7/2014 |
| CN | 108028941 | A | 5/2018 |
| CN | 109996066 | A | 7/2019 |
| CN | 109996071 | A | 7/2019 |
| CN | 110222717 | A | 9/2019 |
| CN | 110222758 | A | 9/2019 |
| CN | 110225342 | A | 9/2019 |
| JP | 2021535689 | A | 12/2021 |
| WO | 2018221863 | A1 | 12/2018 |
| WO | 2020018985 | A1 | 1/2020 |
| WO | 2022155245 | A1 | 7/2022 |

OTHER PUBLICATIONS

An enhanced entropy coding scheme for HEVC, Min Gao et al., Elsevier, 2018, pp. 108-123 (Year: 2018).*
Learning a Deep Vector Quantization Network for Image Compression, Xiaotong Lu et al., IEEE, 2019, pp. 118815-118825 (Year: 2019).*
Variable Rate Deep Image Compression With a Conditional Autoencoder, Yoojin Choi et al., ICCV, 2019, pp. 3146-3154 (Year: 2019).*
Adaptive Downsampling to Improve Image Compression at Low Bit Rates, Weisi Lin et al., IEEE, 2006, pp. 2513 to 2521 (Year: 2006).*
Adaptive Quantization Parameter Cascading in HEVC Hierarchical Coding, Tiesong Zhao et al., IEEE, 2016, pp. 2997-3009 (Year: 2016).*
End-To-End Optimized Image Compression, Johannes Balle' et al., arXiv, 2017, pp. 1-27 (Year: 2017).*
Non-local Attention Optimized Deep Image Compression, Haojie Liu et al., arXiv, 2019, pp. 1-10 (Year: 2019).*
Duan et al., "Content-aware Deep Perceptual Image Compression," IEEE, Total 6 pages, Institute of Electrical Electronics Engineers, New York, New York (Oct. 23, 2019).
Shoa et al., "Variable Length Coding for Fixed Rate, Low Latency, Low Complexity Compression Applications," Data Compression Conference, Total 1 page (Apr. 3, 2008).
Chen et al., "Neural Image Compression via Non-Local Attention Optimization and Improved Context Modeling," arXiv:1910.06244v1 [eess.IV], Total 13 pages (Oct. 11, 2019).
Choi et al., "Variable Rate Deep Image Compression With a Conditional Autoencoder," Proceedings of the IEEE/CVF International Conference on Computer Vision (ICCV) Total 9 pages (2019).
Toderici et al., "Full Resolution Image Compression with Recurrent Neural Networks," arXiv:1608.05148v2 [cs.CV], Total 9 pages (Jul. 7, 2017).
Zhen-Shan et al., "Research on image compression encryption algorithm based on chaos algorithm and compression perception," Microelectronics & Computer vol. 37, No. 2, Total 4 pages (Feb. 2020). With the English Abstract.
Akbari et al., "Learned Variable-Rate Image Compression With Residual Divisive Normalization," arXiv:1912.05688v1 [eess.IV], Total 6 pages (Dec. 11, 2019).
Johnston et al., "Improved Lossy Image Compression with Priming and Spatially Adaptive Bit Rates for Recurrent Networks," arXiv:1703.10114v1 [cs.CV], Total 9 pages (Mar. 29, 2017).
Theis et al., "Lossy Image Compression With Compressive Autoencoders," arXiv:1703.00395v1 [stat.ML], Total 19 pages (Mar. 1, 2017).
Yang et al., "Variable Rate Deep Image Compression with Modulated Autoencoder," Journal of Latex Class Files, vol. 14, No. 8, arXiv:1912.05526v1 [eess.IV] Dec. 11, 2019, Total 5 pages (Aug. 2019).
Toderici et al., "Variable Rate Image Compression With Recurrent Neural Networks," Published as a conference paper at ICLR 2016, arXiv:1511.06085v5 [cs.CV], Total 13 pages (Mar. 1, 2016).
Balle et al., "Variational Image Compression With a Scale Hyperprior," Published as a conference paper at ICLR 2018, arXiv:1802.01436v2 [eess.IV], Total 23 pages (May 1, 2018).
Chen et al., "Neural Image Compression via Non-Local Attention Optimization and Improved Context Modeling," arXiv.org, https://arxiv.org/pdf/1910.06244, Total 13 pages (Oct. 11, 2019).

* cited by examiner

IMAGE PROCESSING METHOD AND RELATED DEVICE

CROSS-REFERENCE TO RELATED APPLICATIONS

This application is a continuation of International Application No. PCT/CN2021/075405, filed on Feb. 5, 2021, which claims priority to Chinese Patent Application No. 202010082808.4, filed on Feb. 7, 2020. The disclosures of the aforementioned applications are hereby incorporated by reference in their entireties.

TECHNICAL FIELD

Embodiments of this application relate to the field of artificial intelligence, and in particular, to an image processing method and a related device.

BACKGROUND

Nowadays, multimedia data occupies the vast majority of Internet traffic. Compression of image data plays a vital role in storage and efficient transmission of multimedia data. Therefore, image encoding is a technology of great practical value.

Image encoding has been researched for a long history. Researchers put forward a large quantity of methods and formulate various international standards, such as JPEG, JPEG2000, WebP, and BPG. Although these encoding methods are all widely applied at present, these conventional methods show some limitations for an increasing amount of image data and continuously emerging new media types.

In recent years, researchers have started to research an image encoding method that is based on deep learning. Some researchers have already achieved good results. For example, Ballé et al. proposed an end-to-end optimization image encoding method, surpassing current best image encoding performance and even surpassing a current best conventional encoding standard BPG. However, currently, most image encoding based on a deep convolutional network has a disadvantage, that is, one trained model can output only one encoding result for one type of input image, and consequently an encoding effect of a target compression bit rate cannot be obtained based on an actual requirement.

SUMMARY

This application provides an image processing method, to implement compression bit rate control in a same compression model.

According to a first aspect, this application provides an image processing method. The method includes:
obtaining a first image; performing feature extraction on the first image to obtain at least one first feature map, where the at least one first feature map includes N first feature values, and N is a positive integer; obtaining a target compression bit rate, where the target compression bit rate corresponds to M target gain values, each target gain value corresponds to one first feature value, and M is a positive integer less than or equal to N; respectively processing corresponding first feature values based on the M target gain values to obtain M second feature values, where the original first feature map may be replaced with at least one processed first feature map in this embodiment of this application; and performing quantization and entropy encoding on the at least one processed first feature map to obtain encoded data, where the at least one processed first feature map includes the M second feature values. In the foregoing manner, different target gain values are set for different target compression bit rates, to implement compression bit rate control.

In an optional design of the first aspect, information entropy of quantized data obtained by quantizing the at least one processed first feature map meets a preset condition, and the preset condition is related to the target compression bit rate.

In an optional design of the first aspect, a larger target compression bit rate indicates larger information entropy of the quantized data.

In an optional design of the first aspect, a difference between a compression bit rate corresponding to the encoded data and the target compression bit rate falls within a preset range.

In an optional design of the first aspect, the M second feature values are obtained by separately performing a multiplication operation on the M target gain values and the corresponding first feature values.

In an optional design of the first aspect, the at least one first feature map includes a first target feature map, the first target feature map includes P first feature values, all of the P first feature values correspond to a same target gain value, and P is a positive integer less than or equal to M.

In an optional design of the first aspect, the method further includes:
determining, based on a target mapping relationship, the M target gain values corresponding to the target compression bit rate, where the target mapping relationship is used to indicate an association relationship between a compression bit rate and M target gain values, where
the target mapping relationship includes a plurality of compression bit rates, a plurality of gain vectors, and association relationships between the plurality of compression bit rates and the plurality of gain vectors, the target compression bit rate is one of the plurality of compression bit rates, and the M target gain values are elements of one of the plurality of gain vectors; or
the target mapping relationship includes a target function mapping relationship, and when an input of the target function relationship includes the target compression bit rate, an output of the target function relationship includes the M target gain values.

In an optional design of the first aspect, the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values.

In an optional design of the first aspect, the M first gain values include a first target gain value, the M second gain values include a second target gain value, the M target gain values include a third target gain value, the first target gain value, the second target gain value, and the third target gain value correspond to a same one of the M first feature values, and the third target gain value is obtained by performing an interpolation operation on the first target gain value and the second target gain value.

In an optional design of the first aspect, the first image includes a target object, and the M first feature values are feature values that are in the at least one feature map and that correspond to the target object.

In an optional design of the first aspect, each of the M target gain values corresponds to one reverse gain value, the reverse gain value is used to process a feature value obtained in a decoding process of the encoded data, and a product of each of the M target gain values and the corresponding reverse gain value falls within a preset range.

In an optional design of the first aspect, the method further includes: performing entropy decoding on the encoded data to obtain at least one second feature map, where the at least one second feature map includes N third feature values, and each third feature value corresponds to one first feature value; obtaining M target reverse gain values, where each target reverse gain value corresponds to one third feature value; respectively performing gain processing on corresponding third feature values based on the M target reverse gain values, to obtain M fourth feature values; and performing image reconstruction on at least one second feature map obtained after the reverse gain processing, to obtain a second image, where the at least one second feature map obtained after the reverse gain processing includes the M fourth feature values.

In an optional design of the first aspect, the M fourth feature values are obtained by separately performing a multiplication operation on the M target reverse gain values and the corresponding third feature values.

In an optional design of the first aspect, the at least one second feature map includes a second target feature map, the second target feature map includes P third feature values, all of the P third feature values correspond to a same target reverse gain value, and P is a positive integer less than or equal to M.

In an optional design of the first aspect, the method further includes: determining, based on a target mapping relationship, the M target reverse gain values corresponding to the target compression bit rate, where the target mapping relationship is used to indicate an association relationship between a compression bit rate and a reverse gain vector.

In an optional design of the first aspect, the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors.

In an optional design of the first aspect, the target mapping relationship includes a target function mapping relationship, and when an input of the target function relationship includes the target compression bit rate, an output of the target function relationship includes the M target reverse gain values.

In an optional design of the first aspect, the second image includes a target object, and the M third feature values are feature values that are in the at least one feature map and that correspond to the target object.

In an optional design of the first aspect, a product of each of the M target gain values and a corresponding target reverse gain value falls within a preset range.

In an optional design of the first aspect, the target compression bit rate is greater than the first compression bit rate and less than the second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

In an optional design of the first aspect, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M third feature values, and the third target reverse gain value is obtained by performing an interpolation operation on the first target reverse gain value and the second target reverse gain value.

According to a second aspect, this application provides an image processing method. The method includes:

obtaining encoded data; performing entropy decoding on the encoded data to obtain at least one second feature map, where the at least one second feature map includes N third feature values, and N is a positive integer; obtaining M target reverse gain values, where each target reverse gain value corresponds to one third feature value, and M is a positive integer less than or equal to N; respectively processing corresponding third feature values based on the M target reverse gain values, to obtain M fourth feature values; and performing image reconstruction on at least one processed second feature map to obtain a second image, where the at least one processed second feature map includes the M fourth feature values.

In an optional design of the second aspect, the M fourth feature values are obtained by separately performing a multiplication operation on the M target reverse gain values and the corresponding third feature values.

In an optional design of the second aspect, the at least one second feature map includes a second target feature map, the second target feature map includes P third feature values, all of the P third feature values correspond to a same target reverse gain value, and P is a positive integer less than or equal to M.

In an optional design of the second aspect, the method further includes: obtaining a target compression bit rate; and determining, based on a target mapping relationship, the M target reverse gain values corresponding to the target compression bit rate, where the target mapping relationship is used to indicate an association relationship between a compression bit rate and a reverse gain vector, where the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors; or the target mapping relationship includes a target function mapping relationship, and when an input of the target function relationship includes the target compression bit rate, an output of the target function relationship includes the M target reverse gain values.

In an optional design of the second aspect, the second image includes a target object, and the M third feature values are feature values that are in the at least one feature map and that correspond to the target object.

In an optional design of the second aspect, the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

In an optional design of the second aspect, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

According to a third aspect, this application provides an image processing method. The method includes:

obtaining a first image;

performing feature extraction on the first image based on an encoding network to obtain at least one first feature map, where the at least one first feature map includes N first feature values, and N is a positive integer;

obtaining a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N;

respectively processing corresponding first feature values based on the M initial gain values to obtain M second feature values;

performing quantization and entropy encoding on at least one processed first feature map based on a quantization network and an entropy encoding network to obtain encoded data and a bit rate loss, where the at least one first feature map obtained after the gain processing includes the M second feature values;

performing entropy decoding on the encoded data based on an entropy decoding network to obtain at least one second feature map, where the at least one second feature map includes M third feature values, and each third feature value corresponds to one first feature value;

respectively processing the corresponding third feature values based on the M initial reverse gain values to obtain M fourth feature values;

performing image reconstruction on at least one processed second feature map based on a decoding network to obtain a second image, where the at least one processed feature map includes the M fourth feature values;

obtaining a distortion loss of the second image relative to the first image;

performing joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network; and outputting a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

In an optional design of the third aspect, information entropy of quantized data obtained by quantizing the at least one first feature map obtained after the gain processing meets a preset condition, and the preset condition is related to the target compression bit rate.

In an optional design of the third aspect, the preset condition includes at least: a larger target compression bit rate indicates larger information entropy of the quantized data.

In an optional design of the third aspect, the M second feature values are obtained by separately performing a multiplication operation on the M target gain values and the corresponding first feature values.

In an optional design of the third aspect, the at least one first feature map includes a first target feature map, the first target feature map includes P first feature values, all of the P first feature values correspond to a same target gain value, and P is a positive integer less than or equal to M.

In an optional design of the third aspect, the first image includes a target object, and the M first feature values are feature values that are in the at least one feature map and that correspond to the target object.

In an optional design of the third aspect, a product of each of the M target gain values and a corresponding target reverse gain value falls within a preset range, and a product of each of the M initial gain values and a corresponding initial reverse gain value falls within a preset range.

According to a fourth aspect, this application provides an image processing apparatus. The apparatus includes:

an obtaining module, configured to obtain a first image;

a feature extraction module, configured to perform feature extraction on the first image to obtain at least one first feature map, where the at least one first feature map includes N first feature values, and N is a positive integer, where the obtaining module is further configured to obtain a target compression bit rate, where the target compression bit rate corresponds to M target gain values, each target gain value corresponds to one first feature value, and M is a positive integer less than or equal to N;

a gain module, configured to respectively process corresponding first feature values based on the M target gain values to obtain M second feature values; and a quantization and entropy encoding module, configured to perform quantization and entropy encoding on at least one processed first feature map to obtain encoded data, where the at least one processed first feature map includes the M second feature values.

In an optional design of the fourth aspect, information entropy of quantized data obtained by quantizing the at least one processed first feature map meets a preset condition, and the preset condition is related to the target compression bit rate.

In an optional design of the fourth aspect, the preset condition includes at least:

a larger target compression bit rate indicates larger information entropy of the quantized data.

In an optional design of the fourth aspect, a difference between a compression bit rate corresponding to the encoded data and the target compression bit rate falls within a preset range.

In an optional design of the fourth aspect, the M second feature values are obtained by separately performing a multiplication operation on the M target gain values and the corresponding first feature values.

In an optional design of the fourth aspect, the at least one first feature map includes a first target feature map, the first target feature map includes P first feature values, all of the P first feature values correspond to a same target gain value, and P is a positive integer less than or equal to M.

In an optional design of the fourth aspect, the apparatus further includes:
  a determining module, configured to determine, based on a target mapping relationship, the M target gain values corresponding to the target compression bit rate, where the target mapping relationship is used to indicate an association relationship between a compression bit rate and M target gain values, where
  the target mapping relationship includes a plurality of compression bit rates, a plurality of gain vectors, and association relationships between the plurality of compression bit rates and the plurality of gain vectors, the target compression bit rate is one of the plurality of compression bit rates, and the M target gain values are elements of one of the plurality of gain vectors; or
  the target mapping relationship includes a target function mapping relationship, and when an input of the target function relationship includes the target compression bit rate, an output of the target function relationship includes the M target gain values.

In an optional design of the fourth aspect, the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values.

In an optional design of the fourth aspect, the M first gain values include a first target gain value, the M second gain values include a second target gain value, the M target gain values include a third target gain value, the first target gain value, the second target gain value, and the third target gain value correspond to a same one of the M first feature values, and the third target gain value is obtained by performing an interpolation operation on the first target gain value and the second target gain value.

In an optional design of the fourth aspect, the first image includes a target object, and the M first feature values are feature values that are in the at least one feature map and that correspond to the target object.

In an optional design of the fourth aspect, each of the M target gain values corresponds to one reverse gain value, the reverse gain value is used to process a feature value obtained in a decoding process of the encoded data, and a product of each of the M target gain values and the corresponding reverse gain value falls within a preset range.

In an optional design of the fourth aspect, the apparatus further includes:
  a decoding module, configured to perform entropy decoding on the encoded data to obtain at least one second feature map, where the at least one second feature map includes N third feature values, and each third feature value corresponds to one first feature value;
  the obtaining module is further configured to obtain M target reverse gain values, where each target reverse gain value corresponds to one third feature value; and the apparatus further includes:
  a reverse gain module, configured to respectively perform gain processing on corresponding third feature values based on the M target reverse gain values, to obtain M fourth feature values; and
  a reconstruction module, configured to perform image reconstruction on at least one second feature map obtained after the reverse gain processing, to obtain a second image, where the at least one second feature map obtained after the reverse gain processing includes the M fourth feature values.

In an optional design of the fourth aspect, the M fourth feature values are obtained by separately performing a multiplication operation on the M target reverse gain values and the corresponding third feature values.

In an optional design of the fourth aspect, the at least one second feature map includes a second target feature map, the second target feature map includes P third feature values, all of the P third feature values correspond to a same target reverse gain value, and P is a positive integer less than or equal to M.

In an optical design of the fourth aspect, the determining module is further configured to:
  determine, based on a target mapping relationship, the M target reverse gain values corresponding to the target compression bit rate, where the target mapping relationship is used to indicate an association relationship between a compression bit rate and a reverse gain vector.

In an optional design of the fourth aspect, the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors.

In an optional design of the fourth aspect, the target mapping relationship includes a target function mapping relationship, and when an input of the target function relationship includes the target compression bit rate, an output of the target function relationship includes the M target reverse gain values.

In an optional design of the fourth aspect, the second image includes a target object, and the M third feature values are feature values that are in the at least one feature map and that correspond to the target object.

In an optional design of the fourth aspect, a product of each of the M target gain values and a corresponding target reverse gain value falls within a preset range.

In an optional design of the fourth aspect, the target compression bit rate is greater than the first compression bit rate and less than the second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

In an optional design of the fourth aspect, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

According to a fifth aspect, this application provides an image processing apparatus. The apparatus includes:
an obtaining module, configured to obtain encoded data;
a decoding module, configured to perform entropy decoding on the encoded data to obtain at least one second feature map, where the at least one second feature map includes N third feature values, and N is a positive integer, where
the obtaining module is further configured to obtain M target reverse gain values, where each target reverse gain value corresponds to one third feature value, and M is a positive integer less than or equal to N;
a reverse gain module, configured to respectively process corresponding third feature values based on the M target reverse gain values, to obtain M fourth feature values; and
a reconstruction module, configured to perform image reconstruction on at least one processed second feature map to obtain a second image, where the at least one processed second feature map includes the M fourth feature values.

In an optional design of the fifth aspect, the M fourth feature values are obtained by separately performing a multiplication operation on the M target reverse gain values and the corresponding third feature values.

In an optional design of the fifth aspect, the at least one second feature map includes a second target feature map, the second target feature map includes P third feature values, all of the P third feature values correspond to a same target reverse gain value, and P is a positive integer less than or equal to M.

In an optional design of the fifth aspect, the obtaining module is further configured to obtain a target compression bit rate; and
the apparatus further includes:
a determining module, configured to determine, based on a target mapping relationship, the M target reverse gain values corresponding to the target compression bit rate, where the target mapping relationship is used to indicate an association relationship between a compression bit rate and a reverse gain vector, where
the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors; or
the target mapping relationship includes a target function mapping relationship, and when an input of the target function relationship includes the target compression bit rate, an output of the target function relationship includes the M target reverse gain values.

In an optional design of the fifth aspect, the second image includes a target object, and the M third feature values are feature values that are in the at least one feature map and that correspond to the target object.

In an optional design of the fifth aspect, the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

In an optional design of the fifth aspect, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

According to a sixth aspect, this application provides an image processing apparatus. The apparatus includes:
an obtaining module, configured to obtain a first image;
a feature extraction module, configured to perform feature extraction on the first image based on an encoding network to obtain at least one first feature map, where the at least one first feature map includes N first feature values, and N is a positive integer, where
the obtaining module is further configured to obtain a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N;
a gain module, configured to respectively process corresponding first feature values based on the M initial gain values to obtain M second feature values;
a quantization and entropy encoding module, configured to perform quantization and entropy encoding on at least one processed first feature map based on a quantization network and an entropy encoding network to obtain encoded data and a bit rate loss, where the at least one first feature map obtained after the gain processing includes the M second feature values;
a decoding module, configured to perform entropy decoding on the encoded data based on an entropy decoding network to obtain at least one second feature map, where the at least one second feature map includes M third feature values, and each third feature value corresponds to one first feature value;
a reverse gain module, configured to respectively process the corresponding third feature values based on the M initial reverse gain values to obtain M fourth feature values;
a reconstruction module, configured to perform image reconstruction on at least one processed second feature map based on a decoding network to obtain a second image, where the at least one processed feature map includes the M fourth feature values, where
the obtaining module is further configured to obtain a distortion loss of the second image relative to the first image;
a training module, configured to perform joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network; and an output module, configured to output a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

In an optional design of the sixth aspect, information entropy of quantized data obtained by quantizing the at least one first feature map obtained after the gain processing meets a preset condition, and the preset condition is related to the target compression bit rate.

In an optional design of the sixth aspect, the preset condition includes at least:

a larger target compression bit rate indicates larger information entropy of the quantized data.

In an optional design of the sixth aspect, the M second feature values are obtained by separately performing a multiplication operation on the M target gain values and the corresponding first feature values.

In an optional design of the sixth aspect, the at least one first feature map includes a first target feature map, the first target feature map includes P first feature values, all of the P first feature values correspond to a same target gain value, and P is a positive integer less than or equal to M.

In an optional design of the sixth aspect, the first image includes a target object, and the M first feature values are feature values that are in the at least one feature map and that correspond to the target object.

In an optional design of the sixth aspect, a product of each of the M target gain values and a corresponding target reverse gain value falls within a preset range, and a product of each of the M initial gain values and a corresponding initial reverse gain value falls within a preset range.

According to a seventh aspect, an embodiment of this application provides an execution device. The execution device may include a memory, a processor, and a bus system. The memory is configured to store a program, and the processor is configured to execute the program in the memory, including the following steps:

obtaining a first image;

performing feature extraction on the first image to obtain at least one first feature map, where the at least one first feature map includes N first feature values, and N is a positive integer;

obtaining a target compression bit rate, where the target compression bit rate corresponds to M target gain values, each target gain value corresponds to one first feature value, and M is a positive integer less than or equal to N;

respectively processing corresponding first feature values based on the M target gain values to obtain M second feature values; and performing quantization and entropy encoding on at least one processed first feature map to obtain encoded data, where the at least one processed first feature map includes the M second feature values.

In an optional design of the seventh aspect, the execution device is a virtual reality VR device, a mobile phone, a tablet computer, a notebook computer, a server, or an intelligent wearable device.

In the seventh aspect of this application, the processor may be further configured to perform the steps of the first aspect or any possible implementations of the first aspect. For details, refer to the first aspect. Details are not described herein again.

According to an eighth aspect, an embodiment of this application provides an execution device. The execution device may include a memory, a processor, and a bus system. The memory is configured to store a program, and the processor is configured to execute the program in the memory, including the following steps:

obtaining encoded data;

performing entropy decoding on the encoded data to obtain at least one second feature map, where the at least one second feature map includes N third feature values, and N is a positive integer;

obtaining M target reverse gain values, where each target reverse gain value corresponds to one third feature value, and M is a positive integer less than or equal to N;

respectively processing corresponding third feature values based on the M target reverse gain values, to obtain M fourth feature values; and performing image reconstruction on at least one processed second feature map to obtain a second image, where the at least one processed second feature map includes the M fourth feature values.

In an optional design of the eighth aspect, the execution device is a virtual reality VR device, a mobile phone, a tablet computer, a notebook computer, a server, or an intelligent wearable device.

In the eighth aspect of this application, the processor may be further configured to perform the steps of the second aspect or any possible implementations of the second aspect. For details, refer to the second aspect. Details are not described herein again.

According to a ninth aspect, an embodiment of this application provides a training device. The training device may include a memory, a processor, and a bus system. The memory is configured to store a program, and the processor is configured to execute the program in the memory, including the following steps:

obtaining a first image;

performing feature extraction on the first image based on an encoding network to obtain at least one first feature map, where the at least one first feature map includes N first feature values, and N is a positive integer;

obtaining a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N;

respectively processing corresponding first feature values based on the M initial gain values to obtain M second feature values;

performing quantization and entropy encoding on at least one processed first feature map based on a quantization network and an entropy encoding network to obtain encoded data and a bit rate loss, where the at least one first feature map obtained after the gain processing includes the M second feature values;

performing entropy decoding on the encoded data based on an entropy decoding network to obtain at least one second feature map, where the at least one second feature map includes M third feature values, and each third feature value corresponds to one first feature value;

respectively processing the corresponding third feature values based on the M initial reverse gain values to obtain M fourth feature values;

performing image reconstruction on at least one processed second feature map based on a decoding network to obtain a second image, where the at least one processed feature map includes the M fourth feature values;

obtaining a distortion loss of the second image relative to the first image;

performing joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network; and outputting a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

In the ninth aspect of this application, the processor may be further configured to perform the steps of the third aspect or any possible implementations of the third aspect. For details, refer to the third aspect. Details are not described herein again.

According to a tenth aspect, an embodiment of this application provides a computer-readable storage medium. The computer-readable storage medium stores a computer program. When the computer program runs on a computer, the computer is enabled to perform the image processing method according to any one of the first aspect to the third aspect.

According to an eleventh aspect, an embodiment of this application provides a computer program. When the computer program runs on a computer, the computer is enabled to perform the image processing method according to any one of the first aspect to the third aspect.

According to a twelfth aspect, this application provides a chip system. The chip system includes a processor, configured to support an execution device or a training device in implementing a function in the foregoing aspects, for example, sending or processing data and/or information in the foregoing methods. In a possible design, the chip system further includes a memory. The memory is configured to store necessary program instructions and data of the execution device or the training device. The chip system may include a chip, or may include a chip and another discrete component.

Embodiments of this application provide the image processing method. The first image is obtained; feature extraction is performed on the first image to obtain the at least one first feature map, where the at least one first feature map includes the N first feature values, and N is a positive integer; the target compression bit rate is obtained, where the target compression bit rate corresponds to the M target gain values, each target gain value corresponds to one first feature value, and M is a positive integer less than or equal to N; the corresponding first feature values are respectively processed based on the M target gain values to obtain the M second feature values; and quantization and entropy encoding are performed on the at least one processed first feature map to obtain the encoded data, where the at least one processed first feature map includes the M second feature values. In the foregoing manner, different target gain values are set for different target compression bit rates, to implement compression bit rate control.

DESCRIPTION OF EMBODIMENTS

The following describes embodiments of the present invention with reference to the accompanying drawings in embodiments of the present invention. Terms used in embodiments of the present invention are merely used to explain specific embodiments of the present invention, and are not intended to limit the present invention.

The following describes embodiments of this application with reference to accompanying drawings. A person of ordinary skill in the art may learn that the technical solutions provided in embodiments of this application are also applied to a similar technical problem as a technology evolves and a new scenario emerges.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
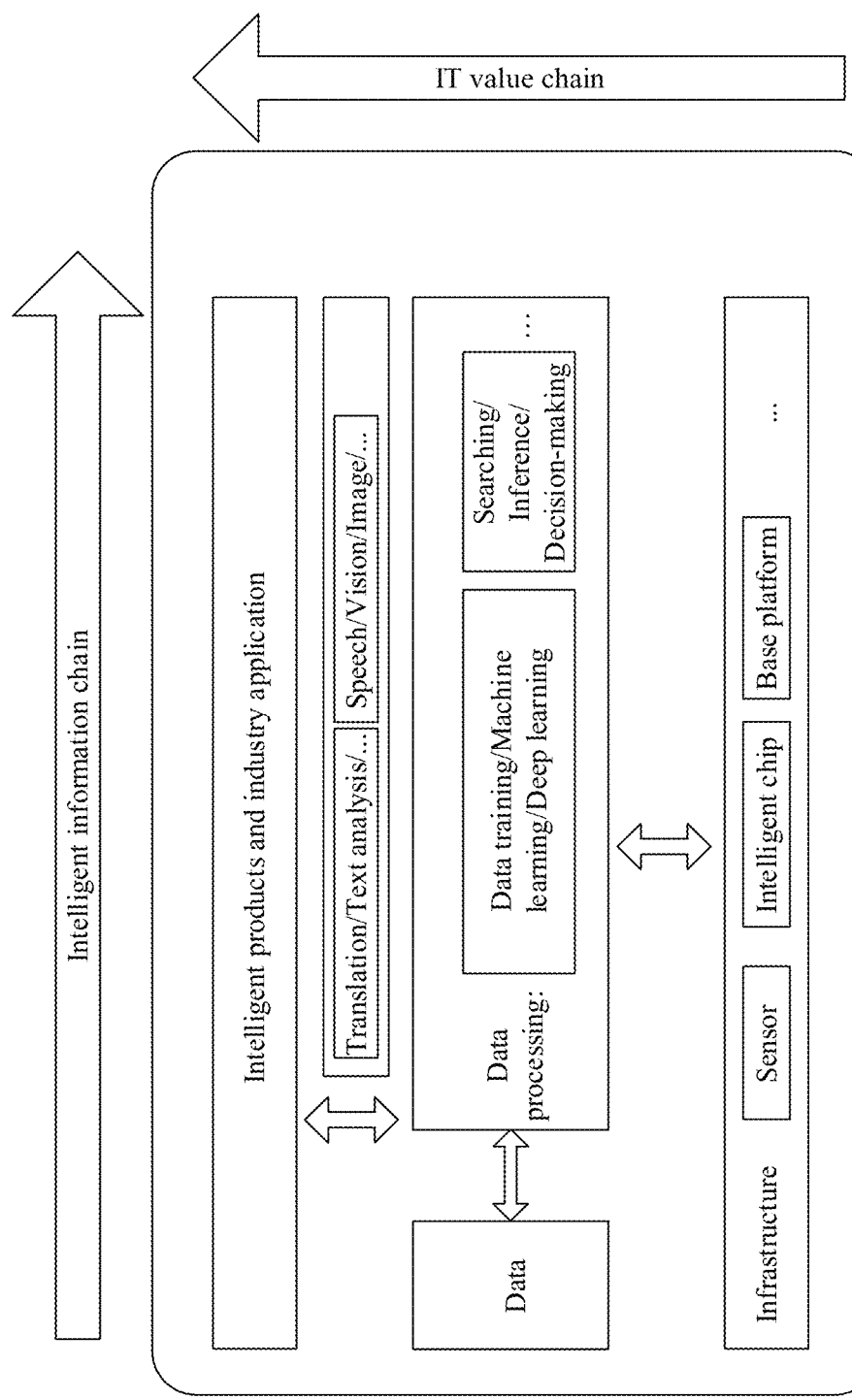
FIG. 1 is a schematic diagram of a structure of an artificial intelligence main framework.

An overall working procedure of an artificial intelligence system is first described. FIG. 1 is a schematic diagram of a structure of an artificial intelligence main framework. The following describes the foregoing artificial intelligence main framework from two dimensions: an "intelligent information chain" (a horizontal axis) and "an IT value chain" (a vertical axis). The "intelligent information chain" reflects a general process from data obtaining to data processing. For example, the process may be a general process of intelligent information perception, intelligent information representation and formation, intelligent reasoning, intelligent decision-making, and intelligent execution and output. In this process, data undergoes a condensation process of "data-information-knowledge-wisdom". The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides calculation capability support for an artificial intelligence system, communicates with an external world, and implements supporting by using a basic platform. The infrastructure communicates with the outside by using a sensor. A calculation capability is provided by an intelligent chip (a hardware acceleration chip such as a CPU, an NPU, a GPU, an ASIC, or an FPGA). The base platform includes related platform assurance and support such as a distributed calculation framework and a network, and may include cloud storage and calculation, an interconnection and interworking network, and the like. For example, the sensor communicates with the outside to obtain data, and the data is provided, for computation, to an intelligent chip in a distributed computing system provided by the basic platform.

(2) Data

Data from a higher layer of the infrastructure indicates a data source in the artificial intelligence field. The data relates to a graph, an image, a voice, and text, further relates to internet of things data of a conventional device, and includes service data of an existing system and perception data such as force, displacement, a liquid level, a temperature, and humidity.

(3) Data Processing

The data processing usually includes manners such as data training, machine learning, deep learning, searching, inference, and decision-making.

The machine learning and the deep learning may mean performing symbolic and formalized intelligent information modeling, extraction, preprocessing, training, and the like on data.

The inference is a process of simulating an intelligent human inference method in a computer or an intelligent system and using, based on an inference control policy, formalized information to carry out machine thinking and resolve problems. Typical functions of the inference are searching and matching.

The decision-making is a process in which a decision is made after intelligent information inference, and usually provides functions such as classification, ranking, and prediction.

(4) General Capabilities

After data processing mentioned above is performed on data, some general capabilities may be further formed based on a data processing result, for example, an algorithm or a general system, to perform translation, text analysis, computer vision processing, speech recognition, image recognition, and the like.

(5) Intelligent Products and Industry Application

Intelligent products and industry application are products and application of an artificial intelligence system in various fields, and indicate encapsulation of an overall artificial intelligence solution, productization of intelligent information decision-making, and realization of landing application. An application field thereof mainly includes intelligent terminals, intelligent transportation, intelligent medical treatment, self-driving, safe cities, and the like.

This application may be applied to the image processing field in the artificial intelligence field, and the following describes a plurality of application scenarios of product landing.

I. Application to an Image Compression Process in a Terminal Device

Figure 2A:
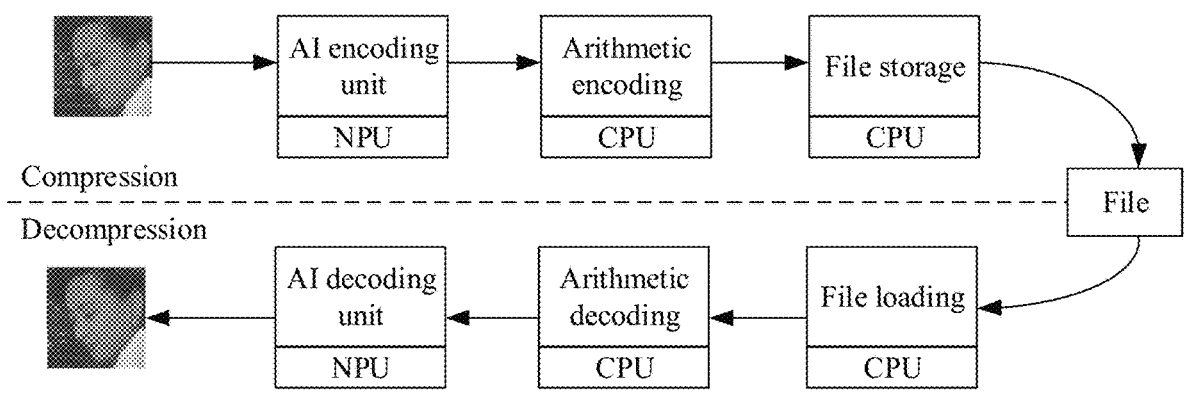
FIG. 2a illustrates an application scenario according to an embodiment of this application.

An image compression method provided in embodiments of this application may be applied to an image compression process in a terminal device, and specifically, may be applied to albums, video surveillance, or the like in the terminal device. For details, refer to FIG. 2a. FIG. 2a illustrates an application scenario according to an embodiment of this application. As shown in FIG. 2a, the terminal device may obtain a to-be-compressed picture. The to-be-compressed picture may be a photo taken by a camera or a frame of picture extracted from a video. The terminal device may perform feature extraction on the obtained to-be-compressed picture by using an artificial intelligence (AI) encoding unit in an embedded neural-network processing unit (NPU), to convert image data into an output feature of lower redundancy; and generate probability estimates of points in the output feature. A central processing unit (CPU) performs arithmetic encoding on the extracted output feature by using the probability estimates of the points in the output feature, to reduce encoding redundancy of the output feature, to further reduce a data transmission amount in the image compression process; and stores, at a corresponding storage position in a form of a data file, encoded data obtained after encoding. When a user needs to obtain the file stored in the storage position, the CPU may obtain and load the stored file from the corresponding storage position, obtain a decoded feature map based on arithmetic decoding, and perform reconstruction on the feature map by using an AI decoding unit in the NPU, to obtain a reconstructed image.

2. Application to an Image Compression Process on a Cloud Side

Figure 2B:
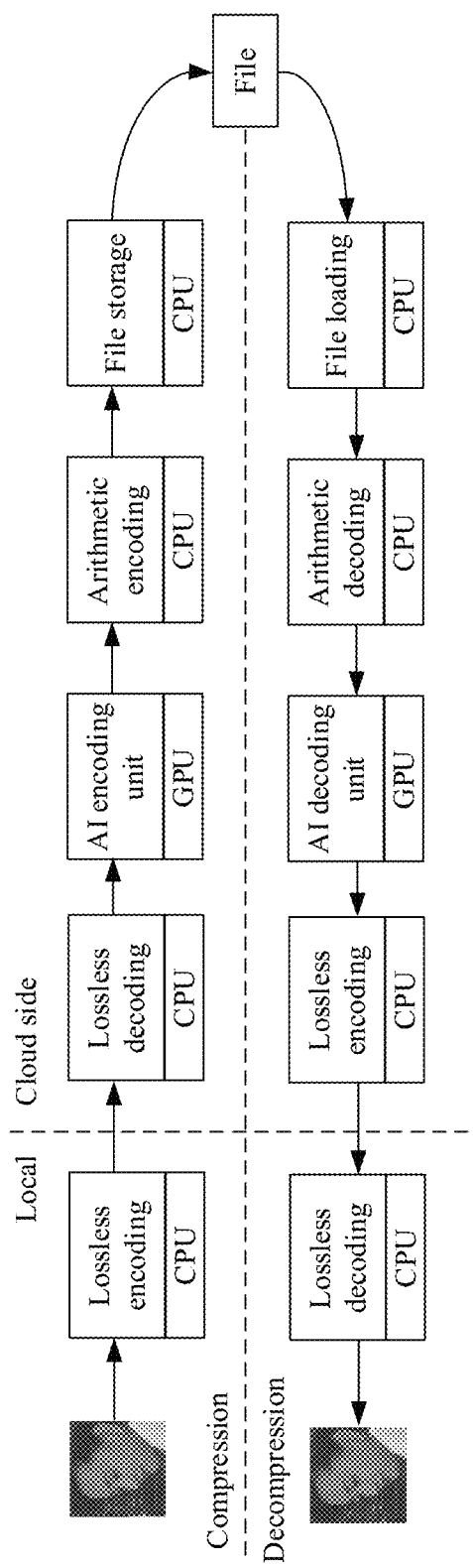
FIG. 2b illustrates an application scenario according to an embodiment of this application.

An image compression method provided in embodiments of this application may be applied to an image compression process on a clod side, and specifically, may be applied to a function such as cloud albums in a cloud-side server. For details, refer to FIG. 2b. FIG. 2b illustrates an application scenario according to an embodiment of this application. As shown in FIG. 2b, a terminal device may obtain a to-be-compressed picture. The to-be-compressed picture may be a photo taken by a camera or a frame of picture extracted from a video. The terminal device may perform lossless encoding compression on the to-be-compressed picture by using a CPU, to obtain encoded data, where the lossless encoding compression may be performed based on, for example, but is not limited to being performed based on, any lossless compression method in the conventional technology. The terminal device may transmit the encoded data to the cloud-side server. The server may perform corresponding lossless decoding on the received encoded data to obtain a to-be-compressed image. The server may perform feature extraction on the obtained to-be-compressed picture by using an AI encoding unit in a graphics processing unit (GPU), to convert image data into an output feature of lower redundancy; and generate probability estimates of points in the output feature. The CPU performs arithmetic encoding on the extracted output feature by using the probability estimates of the points in the output feature, to reduce encoding redundancy of the output feature, to further reduce a data transmission amount in the image compression process; and stores, at a corresponding storage position in a form of a data file, encoded data obtained after encoding. When a user needs to obtain the file stored in the storage position, the CPU may obtain and load the stored file from the corresponding storage position, obtain a decoded feature map based on arithmetic decoding, and perform reconstruction on the feature map by using an AI decoding unit in the NPU, to obtain a reconstructed image. The server may perform lossless encoding compression on the to-be-compressed picture by using the CPU, to obtain encoded data, where the lossless encoding compression may be performed based on, for example, but is not limited to being performed based on, any lossless compression method in the conventional technology. The server may transmit the encoded data to the terminal device, and the terminal device may perform corresponding lossless decoding on the received encoded data, to obtain a decoded image.

In this embodiment of this application, a step of performing gain processing on a feature value in a feature map may be added between the AI encoding unit and a quantization unit, and a step of performing reverse gain processing on a feature value in a feature map may be added between an arithmetic decoding unit and the AI decoding unit. Next, the image processing method in embodiments of this application is described in detail.

Because embodiments of this application relate to a large quantity of neural network applications, for ease of understanding, the following first describes related terms and concepts of a neural network that may be used in embodiments of this application.

(1) Neural Network

The neural network may include neurons. The neuron may be an operation unit that uses xs and an intercept of 1 as inputs, where an output of the operation unit may be as follows:

$h_{W,b}(x) = f(W^T x) = f(\Sigma_{s=1}^{n} W_s x_s + b)$, where $s = 1, 2, \ldots, n$, n is a natural number greater than 1, Ws is a weight of Xs, and b is an offset of the neuron. f is an activation function of the neuron, where the activation function is used to introduce a non-linear characteristic into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN), also referred to as a multi-layer neural network, may be understood as a neural network having a plurality of hidden layers. The DNN is divided based on positions of different layers. A neural network inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

The DNN seems very complicated, but is not complicated for work of each layer. In short, the DNN is the following linear relationship expression: $\vec{y} = \alpha(W \cdot \vec{x} + \vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. Each layer simply performs such a simple operation on the input vector $\vec{x}$ to obtain the output vector $\vec{y}$. Due to a large quantity of layers of the DNN, there are also large quantities of coefficients W and offset vectors $\vec{b}$. These parameters are defined in the DNN as follows: The coefficient W is used as an example. It is assumed that in a three-layer DNN, a linear coefficient from the fourth neuron at the second layer to the second neuron at the third layer is defined as $W_{24}^{3}$. The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at a $L^{th}$ layer is defined as $W_{jk}^{L}$.

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by the vector W at a plurality of layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal and that is in the convolutional neural network. In the convolutional layer of the convolutional neural network, one neuron may be connected to only apart of neurons at a neighboring layer. A convolutional layer generally includes several feature planes, and each feature plane may include some rectanglarly-arranged neurons. Neurons in a same feature plane share a weight, and the shared weight herein is a convolution kernel. Weight sharing may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, weight sharing is advantageous because connections between layers of the convolutional neural network are reduced, and a risk of overfitting is reduced.

(4) Loss Function

In a process of training a deep neural network, because it is expected that an output of the deep neural network is maximally close to an actually predicted value, a current predicted value of the network may be compared with a target value that is expected, and then a weight vector at each layer of the neural network is updated based on a difference between the current predicted value and the target value (there is usually an initialization process before the first update, in other words, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss is generated in an output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

Embodiments of this application first provide descriptions by using an example in which an application scenario is a terminal device.

For example, the terminal device may be a mobile phone, a tablet computer, a notebook computer, or an intelligent wearable device, and the terminal device may perform compression processing on an obtained picture. For another example, the terminal device may be a virtual reality (VR) device. For another example, embodiments of this application may also be applied to intelligent monitoring. A camera may be configured in the intelligent monitoring. In this case, in the intelligent monitoring, a to-be-compressed picture or the like may be obtained by using the camera. It should be understood that embodiments of this application may be further applied to other scenarios in which image compression needs to be performed. The other application scenarios are not listed one by one herein.

Figure 3:
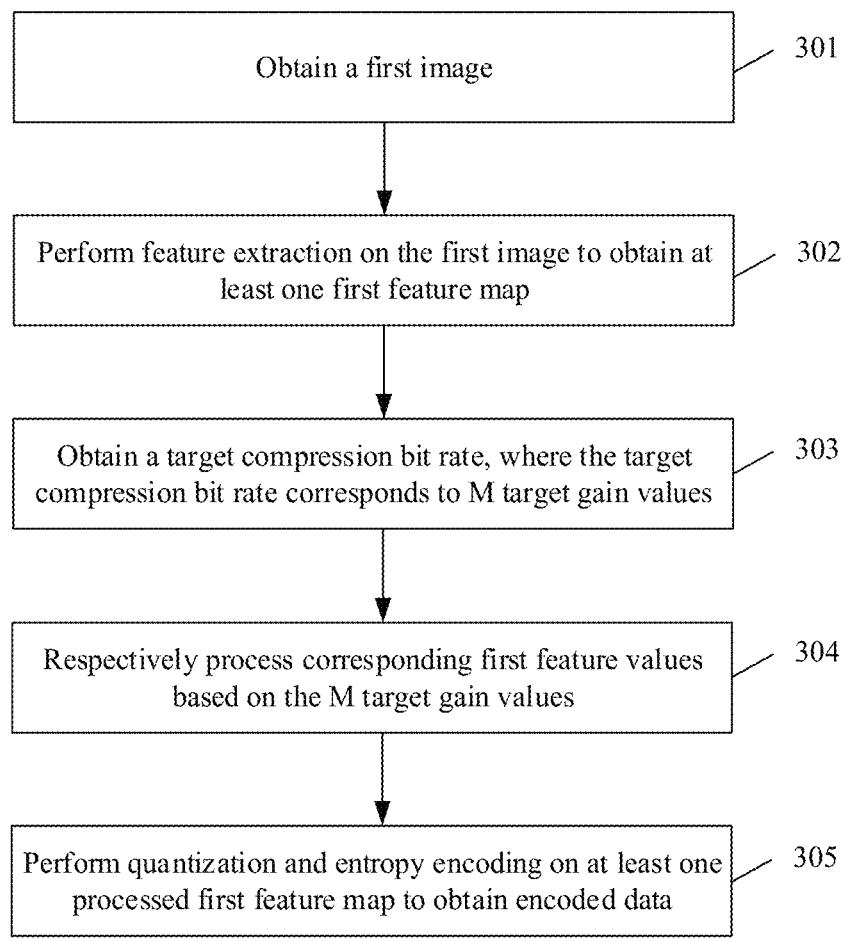
FIG. 3 illustrates an embodiment of an image processing method according to an embodiment of this application.

FIG. 3 illustrates an embodiment of an image processing method according to an embodiment of this application. As shown in FIG. 3, the image processing method provided in this embodiment of this application includes the following steps.

301. Obtain a first image.

In this embodiment of this application, the first image is a to-be-compressed image. The first image may be an image taken by the foregoing terminal device by using a camera, or the first image may be an image obtained from the terminal device (for example, an image stored in albums of the terminal device, or a picture obtained by the terminal device from a cloud). It should be understood that the first image may be an image that has an image compression requirement, and a source of a to-be-processed image is not limited in this application.

302. Perform feature extraction on the first image to obtain at least one first feature map, where the at least one first feature map includes N first feature values, and N is a positive integer.

In this embodiment of this application, optionally, the terminal device may perform feature extraction on the first image based on a CNN, to obtain the at least one first feature map. In the following, the first feature map may also be referred to as a channelwise feature map, and each semantic channel corresponds to one first feature map (channelwise feature map).

Figure 4:
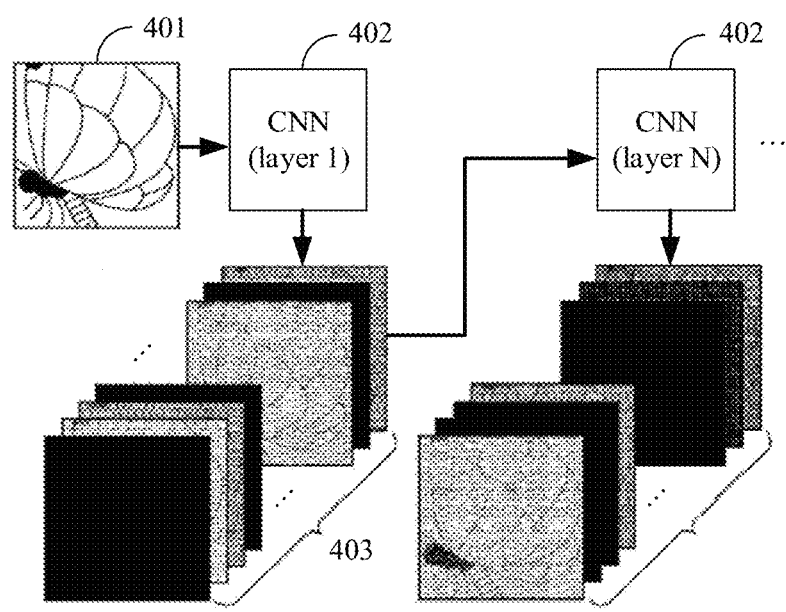
FIG. 4 illustrates a CNN-based image processing process.

In this embodiment of this application, FIG. 4 illustrates a CNN-based image processing process. FIG. 4 shows a first image 401, a CNN 402, and a plurality of first feature maps 403. The CNN 402 may include a plurality of CNN layers.

For example, the CNN 402 may multiply upper-left 3×3 pixels of input data (the first image) by a weight, and map the pixels to upper-left neurons of the first feature maps. The to-be-multiplied weight is also 3×3. Then, in same processing, the CNN 402 scans the input data (first image) from left to right and from top to bottom, and multiplies the input data by the weight to map the input data to neurons of the feature maps. Herein, the used 3×3 weight is referred to as a filter or a filter core. That is, a process of applying a filter to the CNN 402 is a process of performing a convolution operation by using a filter core, and an extracted result is referred to as the "first feature maps". The first feature maps may also be referred to as a multi-channelwise feature map, and the term "multi-channelwise feature map" may be a feature map set corresponding to a plurality of channels. According to an embodiment, the multi-channelwise feature map may be generated by the CNN 402, and the CNN 402 is also referred to as a "feature extraction layer" or "convolution layer" of the CNN. A layer of the CNN may define mapping from an output to an input. Mapping defined by a layer is executed as one or more filter cores (convolution cores) to be applied to input data, to generate feature maps to be output to a next layer. The input data may be images or feature mapping images of a specific layer.

Refer to FIG. 4. During forward execution, the CNN 402 receives the first image 401 and generates a multi-channelwise feature map 403 as an output. In addition, during forward execution, a next layer 402 receives the multi-channelwise feature map 403 as an input, and generates a multi-channelwise feature map 403 as an output. Then, each subsequent layer receives a multi-channelwise feature map generated in a previous layer, and generates a next multi-channelwise feature map as an output. Finally, a multi-channelwise feature map generated in an $(N)^{th}$ layer is received.

In addition, in addition to an operation of applying a convolution core for mapping an input feature map to an output feature map, another processing operation may be performed. An example of the another processing operation may include but is not limited to application of an activation function, pooling, resampling, or the like.

It should be noted that the foregoing is only one implementation for performing feature extraction on the first image. In actual application, a specific feature extraction implementation is not limited.

In this embodiment of this application, in the foregoing manner, an original image (the first image) is converted to another space (the at least one first feature map) by using the CNN convolution neural network. Optionally, there are 192 first feature maps, that is, there are 192 semantic channels, and each semantic channel corresponds to one first feature map. In this embodiment of this application, the at least one first feature map may be in a form of a three-dimensional tensor, and a size of the tensor may be 192×w×h, where w×h is a width and a length of a matrix corresponding to a first feature map of a single channel.

In this embodiment of this application, feature extraction may be performed on the first image to obtain a plurality of feature values. The at least one first feature map may include a part or all of the plurality of feature values. Gain processing may not be performed on feature maps corresponding to some semantic channels that cause relatively small impact on a compression result. In this case, the at least one first feature map includes a part of the plurality of feature values.

In this embodiment of this application, the at least one first feature map includes the N first feature values, and N is a positive integer.

303. Obtain a target compression bit rate, where the target compression bit rate corresponds to M target gain values, each target gain value corresponds to one first feature value, and M is a positive integer less than or equal to N.

In this embodiment of this application, the terminal device may obtain the target compression bit rate. The target compression bit rate may be specified by a user, or may be determined by the terminal device based on the first image. This is not limited herein.

In this embodiment of this application, the target compression bit rate corresponds to the M target gain values, each target gain value corresponds to one first feature value, and M is a positive integer less than or equal to N. That is, there is a specific association relationship between the target compression bit rate and the M target gain values, and after obtaining the target compression bit rate, the terminal device can determine the M corresponding target gain values based on the obtained target compression bit rate.

Optionally, in an embodiment, the terminal device may determine, based on a target mapping relationship, the M target gain values corresponding to the target compression bit rate. The target mapping relationship is used to indicate an association relationship between a compression bit rate and M target gain values. The target mapping relationship may be a pre-stored mapping relationship. After obtaining the target compression bit rate, the terminal device can directly find, at a corresponding storage position, the target mapping relationship corresponding to the target compression bit rate.

Optionally, in an embodiment, the target mapping relationship may include a plurality of compression bit rates, a plurality of gain vectors, and association relationships between the plurality of compression bit rates and the plurality of gain vectors, the target compression bit rate is one of the plurality of compression bit rates, and the M target gain values are elements of one of the plurality of gain vectors.

In this embodiment of this application, the target mapping relationship may be a preset table or in another form. The target mapping relationship includes a plurality of compression bit rates and gain vectors corresponding to the compression bit rates. The gain vector may include a plurality of elements, each compression bit rate corresponds to M target gain values, and the M target gain values are elements included in a gain vector corresponding to each compression bit rate.

Optionally, in an embodiment, the target mapping relationship may include a target function mapping relationship, and when an input of the target function relationship includes the target compression bit rate, an output of the target function relationship includes the M target gain values.

In this embodiment of this application, the target mapping relationship may be a preset target function mapping relationship or in another form. The target function mapping relationship may indicate at least a correspondence between a compression bit rate and a gain value. When an input of the target function relationship includes the target compression bit rate, an output of the target function relationship includes the M target gain values.

It should be noted that in this embodiment of this application, a part or all of the M target gain values may be the same. In this case, a quantity less than M may be used to indicate target gain values that are in the M target feature values and that correspond to first feature values. For example, in an embodiment, the at least one first feature map includes a first target feature map, the first target feature map includes P first feature values, all of the P first feature values correspond to a same target gain value, and P is a positive integer less than or equal to M. That is, the P first feature values are feature values of a same semantic channel, and correspond to the same target gain value. In this case, the P first feature values may be indicated by using one gain value.

In another embodiment, if gain values of first feature values corresponding to each semantic channel are the same, the M first gain values may be indicated by using target gain values of a same quantity as semantic channels. Specifically, when there are 192 semantic channels (first feature maps), the M first gain values may be indicated by using 192 gain values.

In this embodiment of this application, first feature values included in each of all or a part of the at least one first feature map may correspond to a same target gain value. In this case, the at least one first feature map includes a first target feature map, the first target feature map includes P first feature values, all of the P first feature values correspond to a same target gain value, and P is a positive integer less than or equal to M. That is, the first target feature map is one of the at least one first feature map and includes the P first feature values, and all of the P first feature values correspond to the same target gain value.

In this embodiment of this application, the N first feature values may be all feature values included in the at least one first feature map. When M is the same as N, it is equivalent that each of all the feature values included in the at least one first feature map has a corresponding target gain value. When M is less than N, it is equivalent that a part of the feature values included in the at least one first feature map have corresponding target gain values. In an embodiment, if a quantity of first feature maps is greater than 1, each of all feature values included in each of a part of the at least one first feature map has a corresponding target gain value, and a part of feature values included in each of a part of the at least one first feature map have corresponding target gain values.

Optionally, in an embodiment, the first image includes a target object, and M first feature values are feature values that are in the at least one feature map and that correspond to the target object.

In this embodiment of this application, in some scenarios, the M first feature values are feature values that are in the N first feature values and that correspond to one or more target objects. For example, for video content taken by a monitor, gain processing may not be performed on an area with a relatively fixed scene, and gain processing may be performed on content of an object or a person that passes the area.

304. Respectively process the corresponding first feature values based on the M target gain values to obtain M second feature values.

In this embodiment of this application, after the target compression bit rate and the M target gain values corresponding to the target compression bit rate are obtained, the corresponding first feature values may be respectively processed based on the M target gain values to obtain the M second feature values. In an embodiment, the M second feature values are obtained by separately performing a multiplication operation on the M target gain values and the corresponding first feature values, that is, a corresponding second feature value may be obtained after a first feature value is multiplied by a corresponding target gain value.

In this embodiment of this application, to implement effects of different compression bit rates in a same AI compression model, different target gain values may be obtained for different obtained target compression bit rates. After the corresponding first feature values are respectively processed based on the M target gain values to obtain the M second feature values, distribution of the N first feature values included in the at least one feature map corresponding to the original first image changes due to the M first feature values on which gain processing is performed.

Figure 5A:
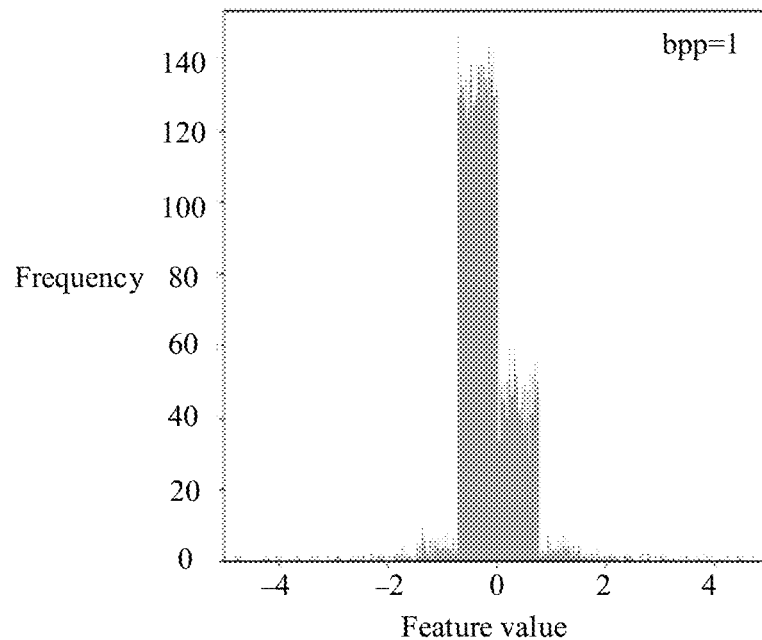
FIG. 5a illustrates information entropy distribution of a feature map at a compression bit rate according to an embodiment of this application.
Figure 5B:
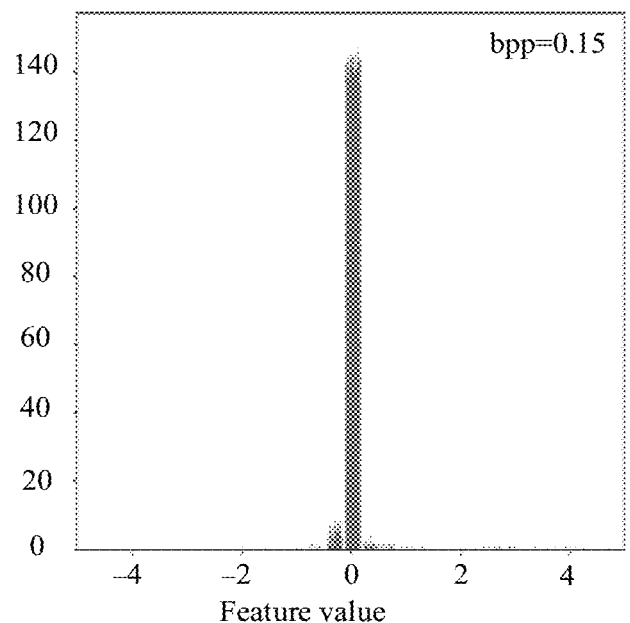
FIG. 5b illustrates information entropy distribution of a feature map at a compression bit rate according to an embodiment of this application.

In this embodiment of this application, FIG. 5a and FIG. 5b illustrate distribution of feature maps for different compression bit rates according to embodiments of this application. Different compression bit rates are represented by using different bits per pixel (bpp). The bpp represents a quantity of bits used to store each pixel, and smaller bpp indicates a smaller compression bit rate. FIG. 5a shows distribution of N first feature values when bpp is 1. FIG. 5b shows distribution of N first feature values when bpp is 0.15. Output features (N first feature values) of an encoding network of a model of a higher compression bit rate have a larger variance in a statistical histogram, and therefore information entropy obtained after quantization is larger. Therefore, provided that different compression bit rates correspond to different target gain values, gaining processing is performed on N first feature values to different degrees based on different target compression bit rates, so that a reconstruction effect of a plurality of bit rates can be implemented in a single AI compression model. Specifically, a selection rule of the M target gain values is as follows: A larger target compression bit rate indicates more dispersed distribution of N first feature values obtained after the corresponding first feature values are respectively processed based on the M target gain values, and therefore information entropy obtained after quantization is larger.

In this embodiment of this application, after feature extraction is performed on the first image to obtain a plurality of first feature maps, all the extracted first feature maps need to be processed. Feature values included in the plurality of first feature maps correspond to a same target gain value. In this case, all the feature values included in the plurality of first feature maps are multiplied by the corresponding target gain value, to change distribution of the N first feature values included in the plurality of first feature maps. A larger target compression bit rate indicates more dispersed distribution of the N first feature values.

In this embodiment of this application, after feature extraction is performed on the first image to obtain a plurality of first feature maps, all the extracted first feature maps need to be processed. Feature values included in each of the plurality of first feature maps correspond to a same target gain value, that is, each first feature map corresponds to one target gain value. In this case, the feature values included in each of the plurality of first feature maps are multiplied by the corresponding target gain value, to change distribution of N first feature values included in the plurality of first feature maps. A larger target compression bit rate indicates more dispersed distribution of the N first feature values.

In this embodiment of this application, after feature extraction is performed on the first image to obtain a plurality of first feature maps, all the extracted first feature maps need to be processed. Feature values included in each of a part of the first feature maps corresponds to a same target gain value, and feature values included in each of a remaining part of the first feature maps correspond to different target gain values, that is, each of the part of the first feature maps corresponds to one target gain value, and each of the remaining part of the first feature maps corresponds to a plurality of target gain values (different feature values in a same feature map may correspond to different target gain values). In this case, the feature values included in each of the part of the plurality of first feature maps are multiplied by the corresponding target gain value, and the feature values included in each of the remaining part of the first feature maps are multiplied by the corresponding target gain values, to change distribution of N first feature values included in the plurality of first feature maps. A larger target compression bit rate indicates more dispersed distribution of the N first feature values.

In this embodiment of this application, after feature extraction is performed on the first image to obtain a plurality of first feature maps, a part of the extracted first feature maps needs to be processed (gain processing may not be performed on first feature maps corresponding to some semantic channels that cause relatively small impact on a compression result). A quantity of extracted first feature maps that need to be processed is greater than 1. Feature values included in each of the plurality of first feature maps correspond to a same target gain value, that is, each first feature map corresponds to one target gain value. In this case, the feature values included in each of the plurality of first feature maps are multiplied by the corresponding target gain value, to change distribution of N first feature values included in the plurality of first feature maps. A larger target compression bit rate indicates more dispersed distribution of the N first feature values.

In this embodiment of this application, after feature extraction is performed on the first image to obtain a plurality of first feature maps, a part of the extracted first feature maps needs to be processed (gain processing may not be performed on first feature maps corresponding to some semantic channels that cause relatively small impact on a compression result). A quantity of extracted first feature maps that need to be processed is greater than 1. Feature values included in each of a part of the first feature maps correspond to a same target gain value, and feature values included in each of a remaining part of the first feature maps correspond to different target gain values, that is, each of the part of the first feature maps corresponds to one target gain value, and each of the remaining part of the first feature maps corresponds to a plurality of target gain values (different feature values in a same feature map may correspond to different target gain values). In this case, the feature values included in each of the part of the plurality of first feature maps are multiplied by the corresponding target gain value, and the feature values included in each of the remaining part of the first feature maps are multiplied by the corresponding target gain values, to change distribution of N first feature values included in the plurality of first feature maps. A larger target compression bit rate indicates more dispersed distribution of the N first feature values.

In this embodiment of this application, after feature extraction is performed on the first image to obtain a plurality of first feature maps, a part of the extracted first feature maps needs to be processed (gain processing may not be performed on first feature maps corresponding to some semantic channels that cause relatively small impact on a compression result). A quantity of extracted first feature maps that need to be processed is equal to 1, and feature values included in the first feature map correspond to a same target gain value, that is, the first feature map corresponds to one target gain value. In this case, the feature values included in the first feature map are multiplied by the corresponding target gain value, to change distribution of N first feature values included in the plurality of first feature maps. A larger target compression bit rate indicates more dispersed distribution of the N first feature values.

In this embodiment of this application, after feature extraction is performed on the first image to obtain a plurality of first feature maps, a part of the extracted first feature maps needs to be processed (gain processing may not be performed on first feature maps corresponding to some semantic channels that cause relatively small impact on a compression result). A quantity of extracted first feature maps that need to be processed is equal to 1, and feature values included in the first feature map correspond to different target gain values, that is, the first feature map corresponds to a plurality of target gain values (different feature values in a same feature map may correspond to different target gain values). In this case, the feature values included in the first feature map are multiplied by the corresponding target gain values, to change distribution of N first feature values included in the plurality of first feature maps. A larger target compression bit rate indicates more dispersed distribution of the N first feature values.

It should be noted that gain processing may be performed on only a part of first feature values included in the first feature map.

It should be noted that, if same-scale gain processing is performed on feature values of semantic channels, that is, first feature values included in a plurality of first feature maps corresponding to all the semantic channels correspond to a same target gain value, although information entropy of N first feature values can be changed, a compression effect is relatively poor. Therefore, a basic gain operation unit is set to a semantic channel level (first feature values included in each of first feature maps corresponding to at least two of all the semantic channels correspond to different target gain values) or a feature value level (at least two of all first feature values included in a first feature map corresponding to the semantic channel correspond to different target gain values), so that a relatively good compression effect can be achieved.

The following describes how to obtain the M target gain values that can implement the foregoing technical effect.

1. Manual Determining Manner

Figure 6:
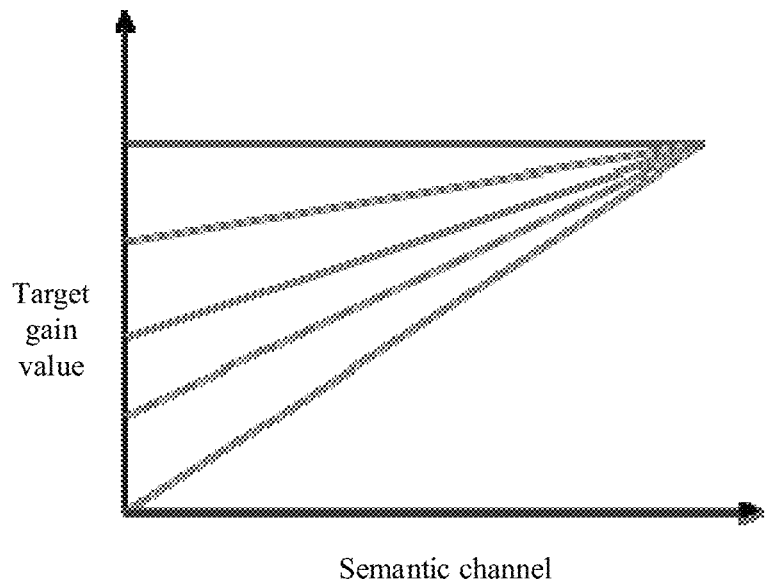
FIG. 6 illustrates a target function mapping relationship according to an embodiment of this application.

In this embodiment of this application, a target function mapping relationship may be manually determined. If first feature values included in a first feature map corresponding to each semantic channel correspond to a same target gain value, an input of the target function mapping relationship may be the semantic channel and a target compression bit rate, and an output of the target function mapping relationship is the corresponding target gain value (because the first feature values included in the first feature map correspond to the same target gain value, all target gain values corresponding to the semantic channel may be represented by using one target gain value). For example, a target gain value corresponding to each semantic channel may be determined by using a linear function, a quadratic function, a cubic function, or a quartic function. FIG. 6 illustrates a target function mapping relationship according to an embodiment of this application. As shown in FIG. 6, the target function mapping relationship is a linear function, an input of the function is a semantic channel sequence number (for example, there are semantic channel sequence numbers 1 to 192), an output of the function is a target mapping function, and each target compression bit rate corresponds to a different target function mapping relationship. A larger target compression bit rate corresponds to a smaller slope of a target function mapping relationship. An approximate distribution law of a quadratic nonlinear function or a cubic nonlinear function is similar to this, and details are not described herein.

In this embodiment of this application, a target gain value corresponding to each of the M first feature values may be manually determined. Provided that a larger target compression bit rate indicates more dispersed distribution of the N first feature values, a specific setting manner is not limited in this application.

2. Training Manner

In this embodiment of this application, obtaining, in a training manner, M target gain values corresponding to each target compression bit rate needs to be combined with a process on a decoding side. Therefore, the obtaining, in a training manner, M target gain values corresponding to each target compression bit rate is described in detail in a subsequent embodiment, and details are not described herein.

305. Perform quantization and entropy encoding on at least one processed first feature map to obtain encoded data, where the at least one processed first feature map includes the M second feature values.

In this embodiment of this application, after the corresponding first feature values are respectively processed based on the M target gain values to obtain the M second feature values, quantization and entropy encoding may be performed on the at least one processed first feature map to obtain the encoded data. The at least one processed first feature map includes the M second feature values.

In this embodiment of this application, the N first feature values are converted to a quantization center according to a specified rule, to facilitate subsequent entropy encoding. The quantization operation may convert the N first feature values from floating point numbers to a bitstream (for example, a bitstream using a specific-bit integer such as an 8-bit integer or a 4-bit integer). In some embodiments, the quantization operation may be performed on the N first feature values through rounding round, but is not limited thereto.

In this embodiment of this application, information entropy of quantized data obtained by quantizing the at least one processed first feature map meets a preset condition, and the preset condition is related to the target compression bit rate. Specifically, a larger target compression bit rate indicates larger information entropy of the quantized data.

In this embodiment of this application, probability estimates of points in an output feature may be obtained by using an entropy estimation network, and entropy encoding is performed on the output feature by using the probability estimates to obtain a binary bitstream. It should be noted that an existing entropy encoding technology may be used in an entropy encoding process in this application, and details are not described in this application.

In this embodiment of this application, a difference between a compression bit rate corresponding to the encoded data and the target compression bit rate falls within a preset range. The preset range may be selected in actual application. Provided that the difference between the compression bit rate corresponding to the encoded data and the target compression bit rate falls within an acceptable range, a specific preset range is not limited in this application.

In this embodiment of this application, after the encoded data is obtained, the encoded data may be sent to a terminal device for decompression. In this case, an image processing device for decompression may decompress the data. Alternatively, a terminal device for compression may store the encoded data in a storage device. When the encoded data is required, the terminal device may obtain the encoded data from the storage device, and may decompress the encoded data.

Optionally, in an embodiment, the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values. In this embodiment of this application, the M first gain values include a first target gain value, the M second gain values include a second target gain value, the M target gain values include a third target gain value, the first target gain value, the second target gain value, and the third target gain value correspond to a same one of the M first feature values, and the third target gain value is obtained by performing an interpolation operation on the first target gain value and the second target gain value.

In this embodiment of this application, compression effects of a plurality of compression bit rates may be implemented in a single model. Specifically, different target gain values may be correspondingly set for a plurality of target compression bit rates, to implement compression effects for different compression bit rates. Then, an interpolation operation may be performed on target gain values by using an interpolation algorithm, to obtain a new gain value of any compression effect in a compression bit rate range. Specifically, the M first gain values include the first target gain value, the M second gain values include the second target gain value, the M target gain values include the third target gain value, the first target gain value, the second target gain value, and the third target gain value correspond to the same one of the M first feature values, and the third target gain value is obtained by performing the interpolation operation on the first target gain value and the second target gain value. The interpolation operation may be performed based on the following formula:

$$m_l = [(m_i)^l \cdot (m_j)^{1-l}], \text{ where}$$

$m_l$ represents the third target gain value, $m_i$ represents the first target gain value, $m_j$ represents the second target gain value, $m_l$, $m_i$, and $m_j$ correspond to the same feature value, and $l \in (0, 1)$ is an adjustment coefficient and may be determined based on a size of the target compression bit rate.

In this embodiment of this application, after M target gain values corresponding to each of a plurality of compression bit rates are obtained, if compression corresponding to the target compression bit rate is to be performed, two groups of target gain values (each group includes M target gain values) corresponding to two compression bit rates adjacent to the target compression bit rate may be determined from the plurality of compression bit rates, and the foregoing interpolation processing is performed on the two groups of target gain values to obtain the M target gain values corresponding to the target compression bit rate. In this embodiment of this application, any compression effect of an AI compression model in a compression bit rate interval can be implemented.

In this embodiment of this application, each of the M target gain values corresponds to one reverse gain value, the reverse gain value is used to process a feature value obtained in a decoding process of the encoded data, and a product of each of the M target gain values and the corresponding reverse gain value falls within a preset range. A reverse gain process on the decoding side is described in a subsequent embodiment, and details are not described herein.

This embodiment of this application provides the image processing method. The first image is obtained; feature extraction is performed on the first image to obtain the at least one first feature map, where the at least one first feature map includes the N first feature values, and N is a positive integer; the target compression bit rate is obtained, where the target compression bit rate corresponds to the M target gain values, each target gain value corresponds to one first feature value, and M is a positive integer less than or equal to N; the corresponding first feature values are respectively processed based on the M target gain values to obtain the M second feature values; and quantization and entropy encoding are performed on the at least one processed first feature map to obtain the encoded data, where the at least one processed first feature map includes the M second feature values. In the foregoing manner, different target gain values are set for different target compression bit rates, to implement compression bit rate control.

Figure 7:
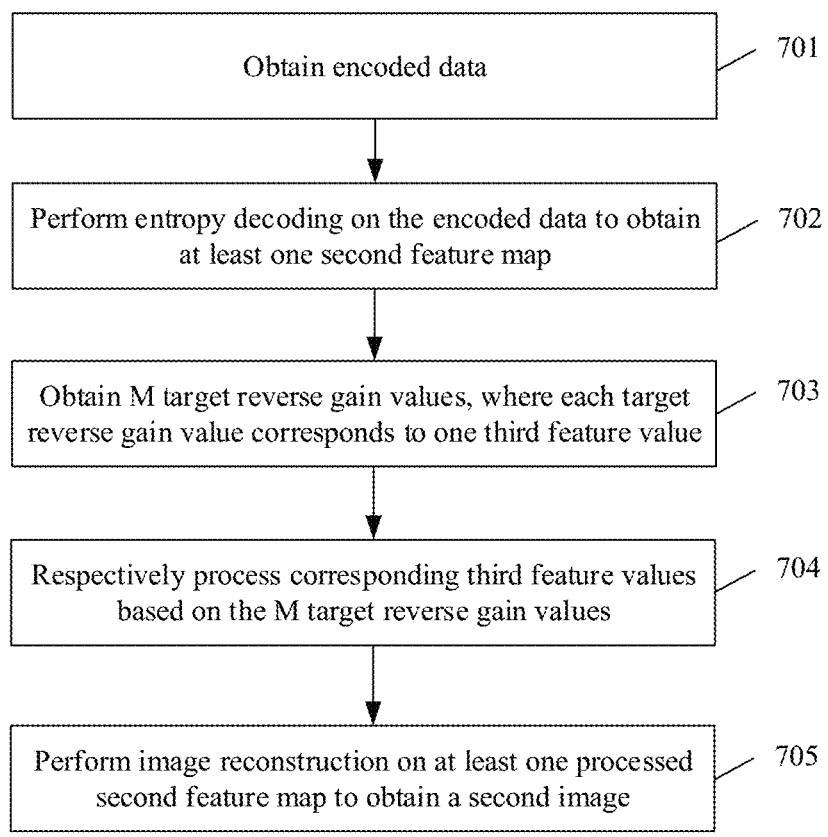
FIG. 7 illustrates an embodiment of an image processing method according to an embodiment of this application.

FIG. 7 illustrates an embodiment of an image processing method according to an embodiment of this application. As shown in FIG. 7, the image processing method provided in this embodiment includes the following steps.

701. Obtain encoded data.

In this embodiment of this application, the encoded data obtained in FIG. 3 and the corresponding embodiment may be obtained.

In this embodiment of this application, after the encoded data is obtained, the encoded data may be sent to a terminal device for decompression. In this case, an image processing device for decompression may obtain the encoded data and decompress the data. Alternatively, a terminal device for compression may store the encoded data in a storage device. When the encoded data is required, the terminal device may obtain the encoded data from the storage device, and may decompress the encoded data.

702. Perform entropy decoding on the encoded data to obtain at least one second feature map, where the at least one second feature map includes N third feature values, and N is a positive integer.

In this embodiment of this application, the encoded data may be decoded by using an entropy decoding technology in the conventional technology, to obtain a reconstructed output feature (the at least one second feature map). The at least one second feature map includes the N third feature values.

It should be noted that the at least one second feature map in this embodiment of this application may be the same as the foregoing at least one processed first feature map.

703. Obtain M target reverse gain values, where each target reverse gain value corresponds to one third feature value, and M is a positive integer less than or equal to N.

Optionally, in an embodiment, a target compression bit rate may be obtained; and the M target reverse gain values corresponding to the target compression bit rate may be determined based on a target mapping relationship. The target mapping relationship is used to indicate an association relationship between a compression bit rate and a reverse gain vector. The target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors; or the target mapping relationship includes a target function mapping relationship, and when an input of the target function relationship includes the target compression bit rate, an output of the target function relationship includes the M target reverse gain values.

In this embodiment of this application, the target reverse gain values may also be obtained in the step of obtaining the target gain values in the embodiment corresponding to FIG. 3. This is not limited herein.

Optionally, in an embodiment, the at least one second feature map includes a second target feature map, the second target feature map includes P third feature values, all of the P third feature values correspond to a same target reverse gain value, and P is a positive integer less than or equal to M.

Optionally, in an embodiment, a second image includes a target object, and M third feature values are feature values that are in the at least one feature map and that correspond to the target object.

704. Respectively process the corresponding third feature values based on the M target reverse gain values, to obtain M fourth feature values.

In this embodiment of this application, the M fourth feature values may be obtained by separately performing a multiplication operation on the M target reverse gain values and the corresponding third feature values. Specifically, in this embodiment of this application, the M third feature values in the at least one second feature map are respectively multiplied by the corresponding reverse gain values to obtain the M fourth feature values, so that at least one second feature map obtained after the reverse gain processing includes the M fourth feature values. The reverse gain processing is combined with the gain processing in the embodiment corresponding to FIG. 3, so that normal image parsing can be ensured.

705. Perform image reconstruction on the at least one processed second feature map to obtain the second image, where the at least one processed second feature map includes the M fourth feature values.

In this embodiment of this application, after the M fourth feature values are obtained, image reconstruction may be performed on the at least one processed second feature map to obtain the second image. The at least one processed second feature map includes the M fourth feature values. The at least one second feature map is parsed and reconstructed into the second image in the foregoing manner.

Optionally, in an embodiment, the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values. In this embodiment of this application, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

In this embodiment of this application, each of the M target gain values corresponds to one reverse gain value, the reverse gain value is used to process a feature value obtained in a decoding process of the encoded data, and a product of each of the M target gain values and the corresponding reverse gain value falls within a preset range, that is, there is a specific value relationship between a target gain value and a reverse gain value that correspond to a same feature value: A product of the two values falls within a preset range. The preset range may be a value range near a value "1" and is not limited herein.

This embodiment of this application provides the image processing method. The encoded data is obtained; entropy decoding is performed on the encoded data to obtain the at least one second feature map, where the at least one second feature map includes the N third feature values, and N is a positive integer; the M target reverse gain values are obtained, where each target reverse gain value corresponds to one third feature value, and M is a positive integer less than or equal to N. The corresponding third feature values are respectively processed based on the M target reverse gain values to obtain the M fourth feature values; image reconstruction is performed on the at least one processed second feature map to obtain the second image, where the at least one processed second feature map includes the M fourth feature values. In the foregoing manner, different target reverse gain values are set for different target compression bit rates, to implement compression bit rate control.

Next, an architecture of a variational autoencoder (VAE) is used as an example to describe the image compression method provided in embodiments of this application. The variational autoencoder is an autoencoder used for data compression or noise reduction.

Figure 8:
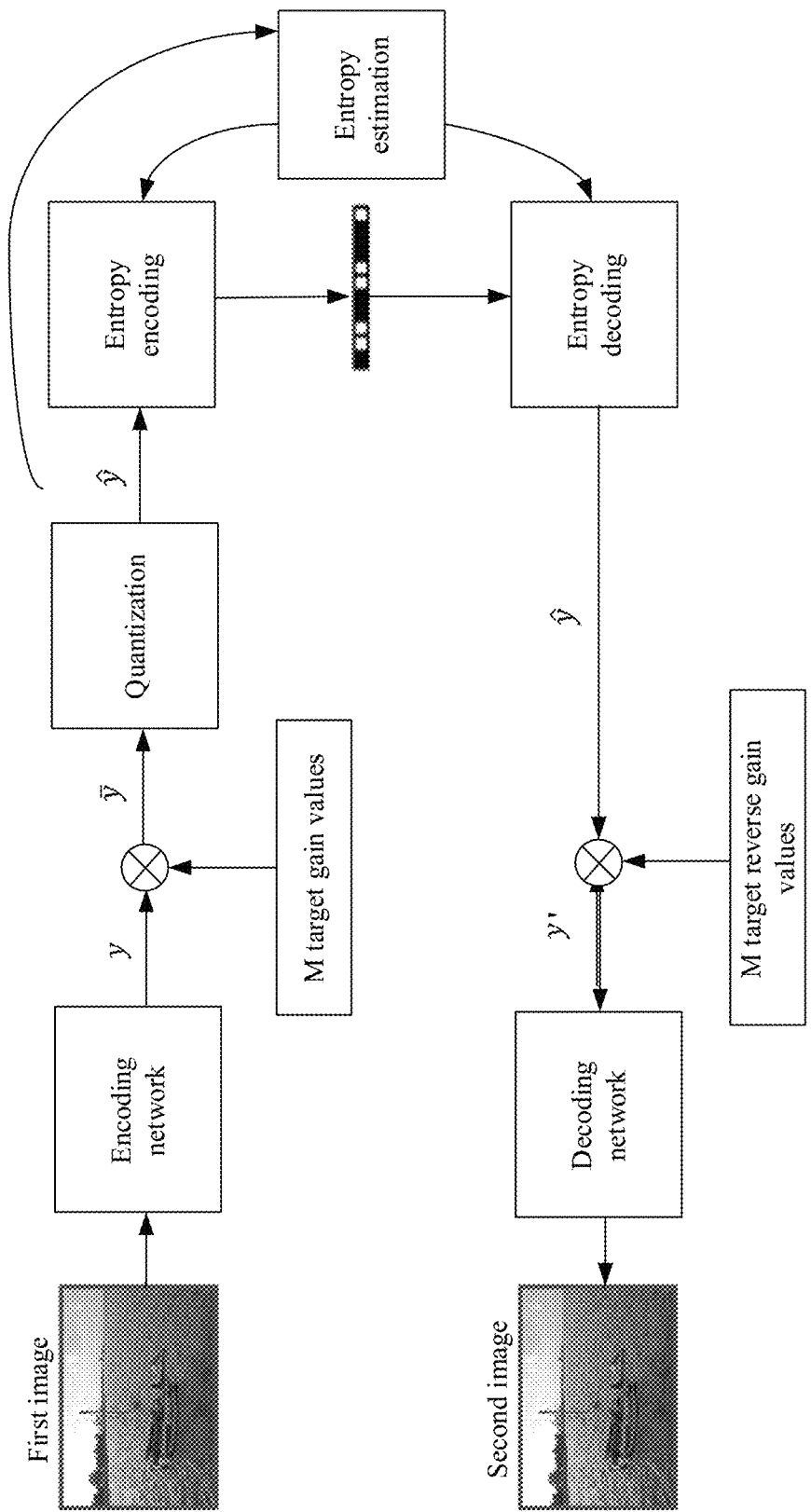
FIG. 8 illustrates an image compression procedure according to an embodiment of this application.

FIG. 8 illustrates an image compression procedure according to an embodiment of this application.

This embodiment provides descriptions by using an example in which target gain values corresponding to a same semantic channel are the same and target reverse gain values corresponding to a same semantic channel are the same. There are 192 semantic channels, and training needs to be performed at four specified code points (four compression bit rates) during training. Each compression bit rate corresponds to one target gain vector and one target reverse gain vector. A target gain vector $m_i$ is a vector that corresponds to a compression bit rate and whose size is 192×1. A target reverse gain vector $m'_i$ is a vector that corresponds to a compression bit rate and whose size is 192×1. y is an output feature (including at least one first feature map) of an encoding network, and a size of the output feature is 192×w×h. w×h is a width and a length of a feature map of a single semantic channel. $\bar{y}$, $\hat{y}$, and y' are respectively new output features obtained after gain processing, quantization, entropy encoding, entropy decoding, and reverse gain processing, and are all the same as y in size. In this embodiment, a VAE method is used as a basic model frame, and a gain unit and a reverse gain unit are added. As shown in FIG. 8, model running may be the following steps:

801. Obtain an output feature y after a first image enters the encoding network.

802. Multiply the output feature y by a corresponding gain vector $m_i$ channel by channel to obtain an output feature $\bar{y}$ obtained after the gain processing.

803. Quantize the output feature $\bar{y}$ to obtain a feature $\hat{y}$.

804. Obtain probability estimates of points in the output feature by using an entropy estimation module, and perform entropy encoding on the output feature by using the probability estimates, to obtain a binary bitstream.

805. Perform entropy decoding on the binary bitstream by using an entropy decoder, to obtain a reconstructed output feature $\hat{y}$.

806. Multiply the output feature $\hat{y}$ by a corresponding reverse gain vector $m'_i$ channel by channel to obtain an output feature y' obtained after the reverse gain processing.

807. Parse and reconstruct the output feature y' into a second image after the output feature enters a decoding network.

Figure 9:
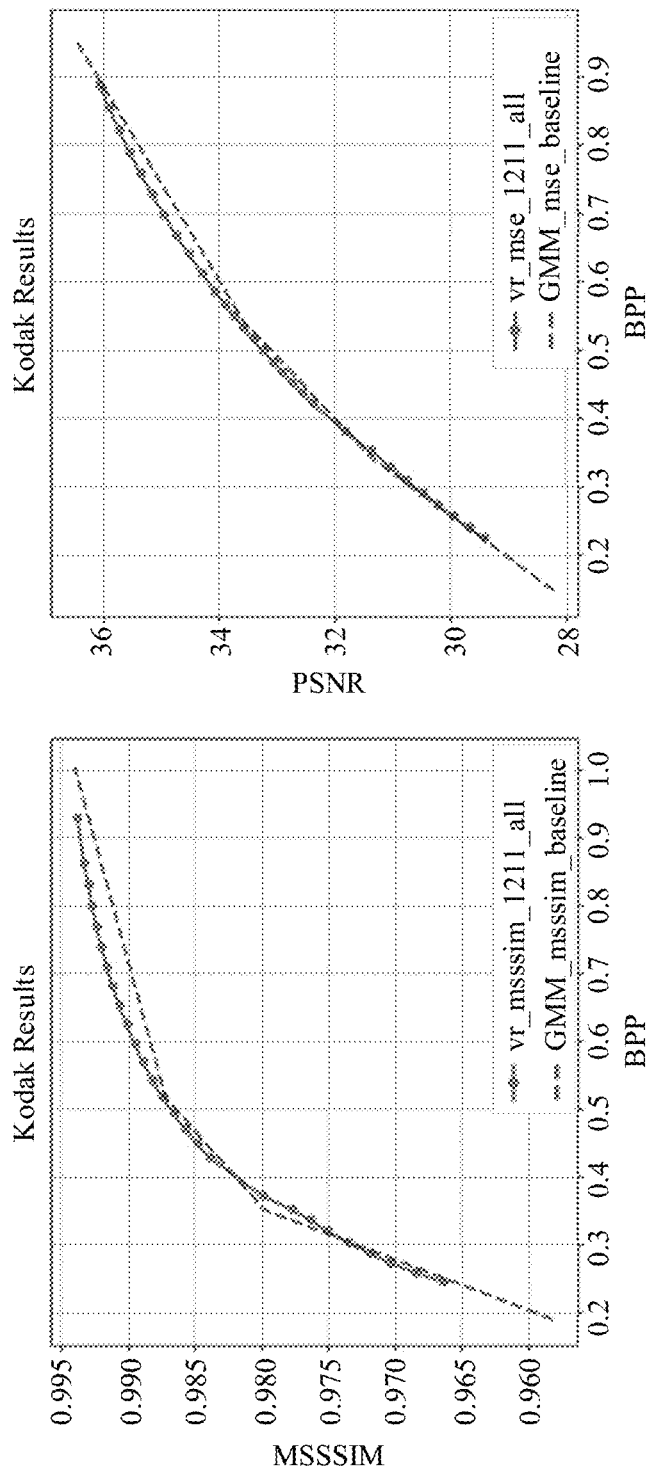
FIG. 9 illustrates a compression effect according to an embodiment of this application.

Refer to FIG. 9. A left figure in FIG. 9 shows comparison, between rate-distortion performance in a single model in this embodiment (non-dashed line) and rate-distortion performance in separately training four compression models by using a VAE method in the conventional technology (dashed line), under a condition in which a multi-scale structural similarity index measure (MS-SSIM) is used as an evaluation indicator, where a horizontal coordinate is BPP, and a vertical coordinate is an MS-SSIM. A right figure in FIG. 9 shows comparison, between rate-distortion performance in a single model in this embodiment (non-dashed line) and rate-distortion performance in separately training four compression models by using a VAE method in the conventional technology (dashed line), under a condition in which a peak signal to noise ratio (PSNR) is used as an evaluation indicator, where a horizontal coordinate is BPP, and a vertical coordinate is a PSNR. It can be learned that, in this embodiment, on a premise that model parameter quantities are basically consistent with model parameter quantities of a single model of the VAE method, a compression effect of any bit rate can be implemented based on both the evaluation indicators, the compression effect is not poorer than a multi-model implementation effect of the VAE method, and a model storage amount can be reduced by N times (N is a quantity of models required for implementing compression effects of different bit rates of this embodiment of the present invention in the VAE method).

Figure 10:
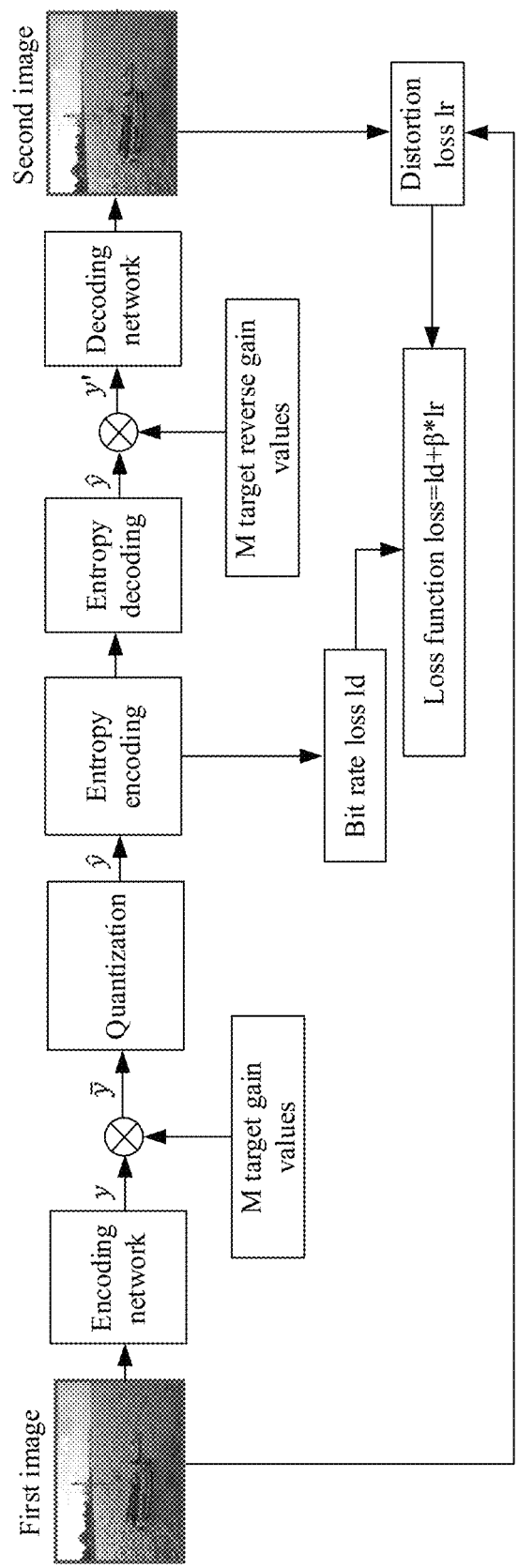
FIG. 10 illustrates a training process according to an embodiment of this application.

FIG. 10 illustrates a training process according to an embodiment of this application As shown in FIG. 10, a loss function of a model in this embodiment is as follows:

$$loss = l_d + \beta \cdot l_r, \text{ where}$$

$l_d$ is a distortion loss that is of a second image relative to a first image and that is calculated based on an evaluation indicator, $l_r$ is a bit rate loss (or referred to as a bit rate estimate) obtained by an entropy estimation network through calculation, and β is a Lagrange coefficient for adjusting a tradeoff between the distortion loss and the bit rate estimate.

To obtain gain and reverse gain matrices {M, M'} matching with different compression bit rates, a model training process may be shown in FIG. 10: The Lagrange coefficient β in the loss function is continuously transformed in the model training process, and corresponding gain and reverse gain vectors $\{m_i, m'_i\}$ are selected from random initialized gain and reverse gain matrices {M, M'} and are respectively placed at a back end of an encoding network and a front end of a decoding network, to implement joint optimization of the gain and reverse gain matrices {M, M'} and the model. In this way, compression effects of a plurality of compression bit rates can be implemented in a single model.

For example, compression effects of four compression bit rates can be implemented in a single model. Four gain vectors obtained through training are multiplied by corresponding reverse gain vectors. Multiplication results of corresponding elements in target gain vectors and target reverse gain vectors corresponding to different compression bit rates are approximately equal, so that the following relationship formula can be obtained:

$$m_i \cdot m'_i \approx m_j \cdot m'_j = C, \text{ where}$$

$[m_i, m'_i]$ and $[m_j, m'_j]$ are respectively gain and reverse gain vector pairs corresponding to different compression bit rates, C is a vector whose elements are all constants, and $i,j \in (1, 4)$.

To implement continuous bit rate adjustment in a single model, the following derivation may be performed in this embodiment by using the foregoing formula:

$$(m_i \cdot m'_i)^l \cdot (m_j \cdot m'_j)^{1-l} = C^l \cdot C^{1-l} = C;$$

$$[(m_i)^l \cdot (m_j)^{1-l}] \cdot [(m'_i)^l \cdot (m'_j)^{1-l}] = C; \text{ and}$$

$$m_l = [(m_i)^l \cdot (m_j)^{1-l}] \text{ and } m'_l = [(m'_i)^l \cdot (m'_j)^{1-l}], \text{ where}$$

$m_i$ and $m_j$ are two adjacent gain/reverse gain vectors in the gain/reverse gain matrix, and $l \in (0, 1)$ is an adjustment coefficient.

In this embodiment of this application, an interpolation operation may be performed on four adjacent gain and reverse gain vector pairs obtained through training, to obtain a new gain and reverse gain vector pair.

To obtain a gain matrix M matching different compression bit rates, a training process is as follows: In this embodiment, the Lagrange coefficient in the loss function is continuously transformed in the model training process, and a corresponding gain vector $m_i$ and a reverse gain vector $m'_i$ are selected from a random initialized gain matrix M. The reverse gain vector $m'_i$ may be generated by obtaining a reciprocal of the gain vector $m_i$. For details, refer to the description of a selection rule of the target gain values and the target reverse gain values in step 705 in the foregoing embodiment. The details are not described herein.

Figure 11:
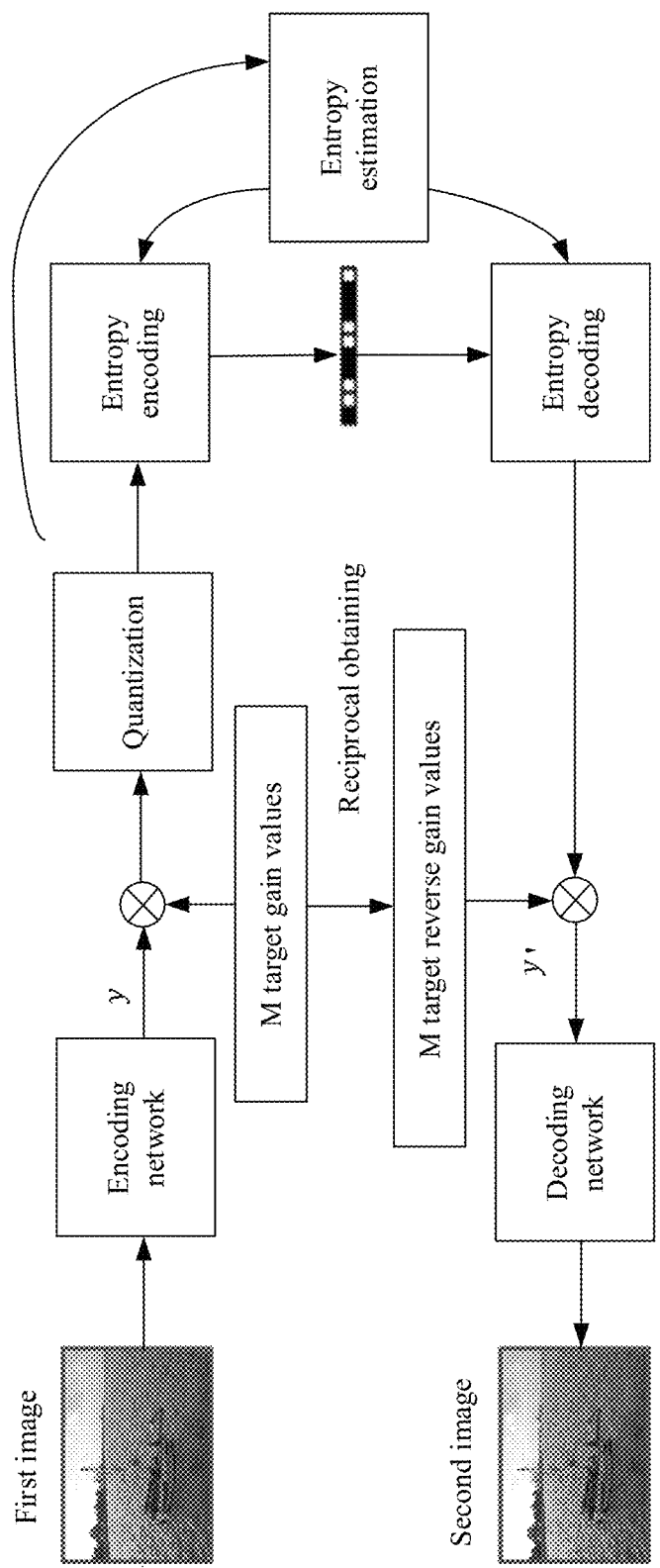
FIG. 11 illustrates an image processing process according to an embodiment of this application.

In this embodiment of this application, the gain vector $m_i$ and the reverse gain vector $m'_i$ are respectively placed in the back end of the encoding network and the front end of the decoding network, to implement joint optimization of the gain matrix M and the model. In this way, compression effects of four bit rates can be implemented in a single model. For details, refer to FIG. 11. FIG. 11 illustrates an image processing process according to an embodiment of this application. Then, an interpolation operation is performed, by using an interpolation algorithm, on four adjacent gain and reverse gain vector pairs obtained through training, so that a new gain vector of any compression effect in a bit rate interval can be obtained.

In this embodiment, on a premise that model parameter quantities are basically consistent with model parameter quantities of a single VAE method model, a compression effect of any bit rate can be implemented, a compression effect is not poorer than an effect of independent training at each bit rate, and a model storage amount can be reduced by N times (N is a quantity of models required for implementing compression effects of different bit rates of this embodiment of the present invention in the VAE method).

It should be noted that only the VAE is used above as an architecture for description. In actual application, the image compression method may be further applied to another AI compression model architecture (for example, an auto-encoder auto-encoder or another image compression model). This is not limited in this application.

Figure 12:
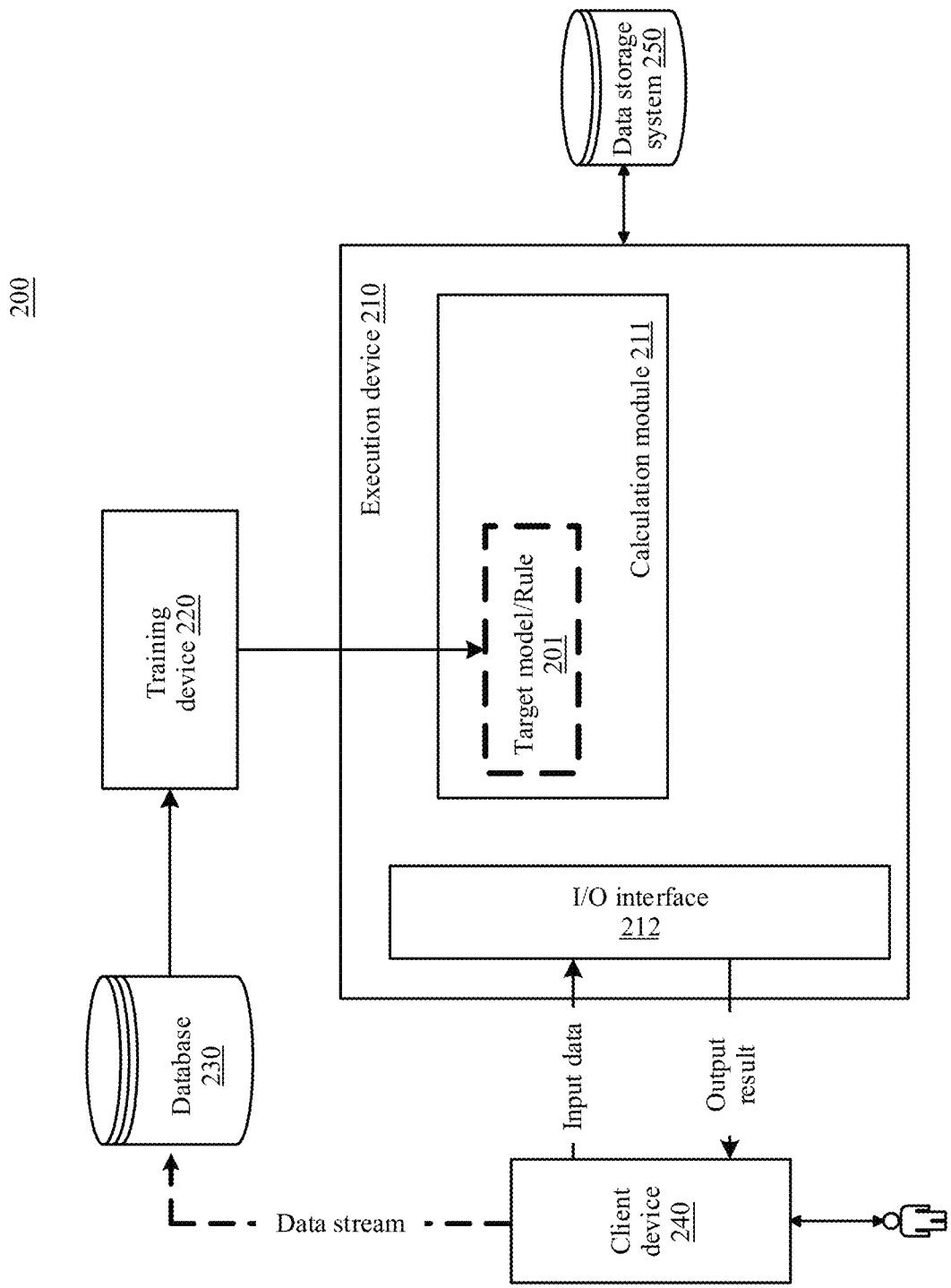
FIG. 12 is a diagram of a system architecture of an image processing system according to an embodiment of this application.

FIG. 12 is a diagram of a system architecture of an image processing system according to an embodiment of this application. In FIG. 12, an image processing system 200 includes an execution device 210, a training device 220, a database 230, a client device 240, and a data storage system 250. The execution device 210 includes a calculation module 211.

The database 230 stores a set of first images. The training device 220 generates a target model/rule 201 used to process the first images, and performs iterative training on the target model/rule 201 by using the first images in the database, to obtain a mature target model/rule 201. This embodiment of this application provides descriptions by using an example in which the target model/rule 201 includes a second encoding/decoding network, and M target gain values and M target reverse gain values that correspond to each compression bit rate.

The second encoding/decoding network, and the M target gain values and the M target reverse gain values that correspond to each compression bit rate that are obtained by the training device 220 may be applied to different systems or devices, such as a mobile phone, a tablet computer, a notebook computer, a VR device, or a monitoring system. The execution device 210 may invoke data, code, or the like in the data storage system 250, or may store data, an instruction, or the like in the data storage system 250. The data storage system 250 may be disposed in the execution device 210, or the data storage system 250 may be an external memory relative to the execution device 210.

The calculation module 211 may perform, by using the second encoding/decoding network, feature extraction on a first image received by the client device 240, to obtain at least one first feature map, where the at least one first feature map includes N first feature values, and N is a positive integer; obtain a target compression bit rate, where the target compression bit rate corresponds to M target gain values, each target gain value corresponds to one first feature value, and M is a positive integer less than or equal to N; respectively process corresponding first feature values based on the M target gain values to obtain M second feature values; and perform quantization and entropy encoding on at least one processed first feature map to obtain encoded data, where the at least one processed first feature map includes the M second feature values.

The calculation module 211 may further perform, by using the second encoding/decoding network, entropy decoding on the encoded data to obtain at least one second feature map, where the at least one second feature map includes N third feature values, and N is a positive integer; obtain M target reverse gain values, where each target reverse gain value corresponds to one third feature value, and M is a positive integer less than or equal to N; respectively process corresponding third feature values based on the M target reverse gain values, to obtain M fourth feature values; and perform image reconstruction on at least one processed second feature map to obtain a second image, where the at least one processed second feature map includes the M fourth feature values.

In some embodiments of this application, refer to FIG. 12. The execution device 210 and the client device 240 may be independent devices. An I/O interface 212 is configured in the execution device 210 to exchange data with the client device 240. A "user" may input the first image to the I/O interface 212 by using the client device 240, and the execution device 210 returns the second image to the client device 240 by using the I/O interface 212, to provide the second image for the user.

It should be noted that FIG. 12 is merely a schematic diagram of an architecture of an image processing system according to an embodiment of the present invention, and position relationships between devices, components, modules, and the like shown in the figure constitute no limitation. For example, in some other embodiments of this application, the execution device 210 may be configured in the client device 240. For example, when the client device is a mobile phone or a tablet computer, the execution device 210 may be a module that is in a host central processing unit (Host CPU) of the mobile phone or the tablet computer and that is configured to process an array image, or the execution device 210 may be a graphics processing unit (GPU) or a neural-network processing unit (NPU) in the mobile phone or the tablet computer. The GPU or the NPU is mounted onto the host central processing unit as a coprocessor, and the host central processing unit allocates a task to the GPU or the NPU.

With reference to the foregoing description, the following starts to describe a specific implementation procedure of a training phase of the image processing method provided in embodiments of this application.

1. Training Phase

Figure 13:
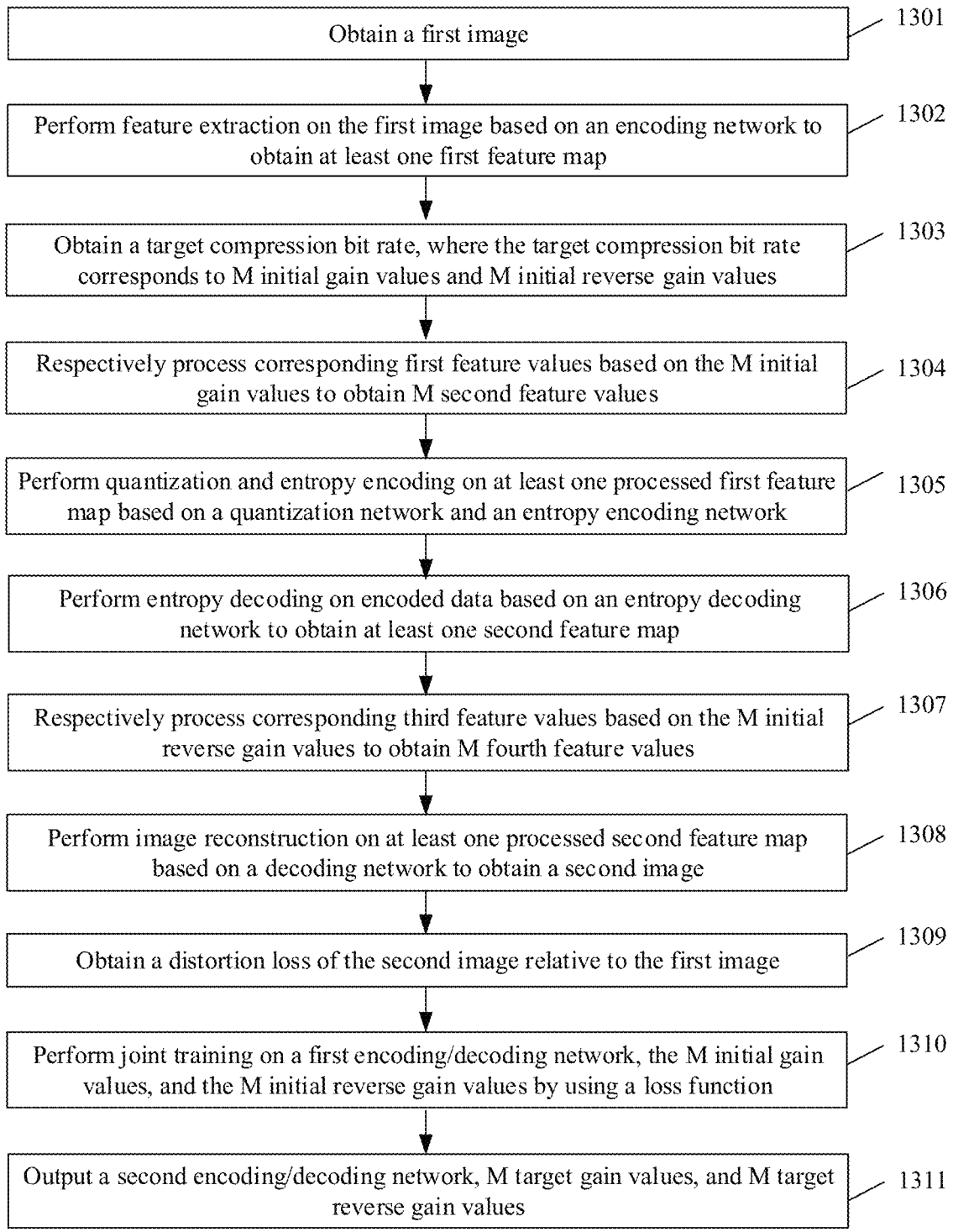
FIG. 13 is a schematic flowchart of an image processing method according to an embodiment of this application.

For details, refer to FIG. 13. FIG. 13 is a schematic flowchart of an image processing method according to an embodiment of this application. The image processing method provided in this embodiment of this application may include the following steps:

1301. Obtain a first image.

1302. Perform feature extraction on the first image based on an encoding network to obtain at least one first feature map, where the at least one first feature map includes N first feature values, and N is a positive integer.

1303. Obtain a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N.

1304. Respectively process corresponding first feature values based on the M initial gain values to obtain M second feature values.

1305. Perform quantization and entropy encoding on at least one processed first feature map based on a quantization network and an entropy encoding network to obtain encoded data and a bit rate loss, where the at least one first feature map obtained after the gain processing includes the M second feature values.

1306. Perform entropy decoding on the encoded data based on an entropy decoding network to obtain at least one second feature map, where the at least one second feature map includes M third feature values, and each third feature value corresponds to one first feature value.

1307. Respectively process the corresponding third feature values based on the M initial reverse gain values to obtain M fourth feature values.

1308. Perform image reconstruction on at least one processed second feature map based on a decoding network to obtain a second image, where the at least one processed feature map includes the M fourth feature values.

1309. Obtain a distortion loss of the second image relative to the first image.

1310. Perform joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network.

1311. Output a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

For specific descriptions of step 1301 to step 1311, refer to the descriptions in the foregoing embodiment. This is not limited herein.

Optionally, information entropy of quantized data obtained by quantizing the at least one processed first feature map meets a preset condition, and the preset condition is related to the target compression bit rate.

Optionally, the preset condition includes at least:
a larger target compression bit rate indicates larger information entropy of the quantized data.

Optionally, the M second feature values are obtained by separately performing a multiplication operation on the M initial gain values and the corresponding first feature values.

Optionally, the M fourth feature values are obtained by separately performing a multiplication operation on the M initial reverse gain values and the corresponding third feature values.

Optionally, a product of each of the M target gain values and a corresponding target reverse gain value falls within a preset range, and a product of each of the M initial gain values and a corresponding initial reverse gain value falls within a preset range.

Figure 14:
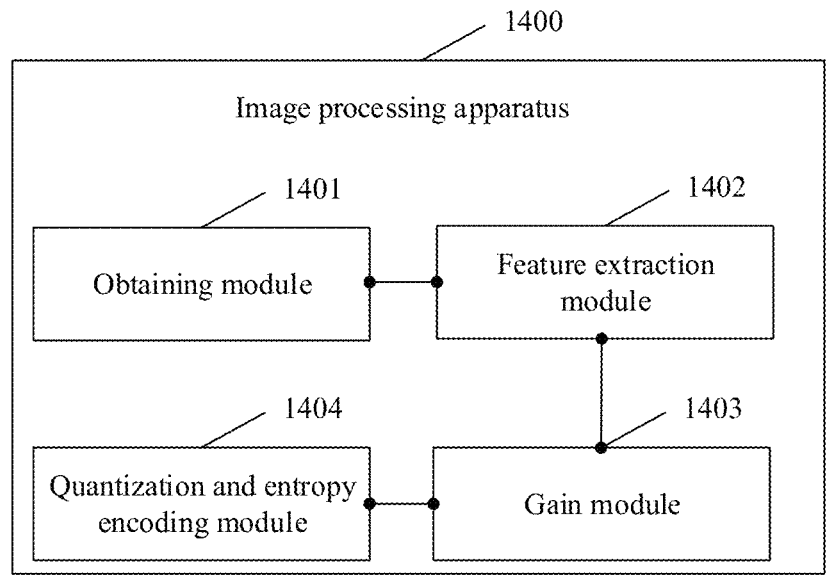
FIG. 14 is a schematic diagram of a structure of an image processing apparatus according to an embodiment of this application.

According to the embodiments corresponding to FIG. 1 to FIG. 13, to better implement the foregoing solutions in embodiments of this application, the following further provides related devices configured to implement the foregoing solutions. For details, refer to FIG. 14. FIG. 14 is a schematic diagram of a structure of an image processing apparatus 1400 according to an embodiment of this application. The image processing apparatus 1400 may be a terminal device or a server, and the image processing apparatus 1400 includes:

an obtaining module 1401, configured to obtain a first image;

a feature extraction module 1402, configured to perform feature extraction on the first image to obtain at least one first feature map, where the at least one first feature map includes N first feature values, and N is a positive integer, where the obtaining module 1401 is further configured to obtain a target compression bit rate, where the target compression bit rate corresponds to M target gain values, each target gain value corresponds to one first feature value, and M is a positive integer less than or equal to N;

a gain module 1403, configured to respectively process corresponding first feature values based on the M target gain values to obtain M second feature values; and a quantization and entropy encoding module 1404, configured to perform quantization and entropy encoding on at least one processed first feature map to obtain encoded data, where the at least one processed first feature map includes the M second feature values.

Optionally, information entropy of quantized data obtained by quantizing the at least one processed first feature map meets a preset condition, and the preset condition is related to the target compression bit rate.

Optionally, the preset condition includes at least:
a larger target compression bit rate indicates larger information entropy of the quantized data.

Optionally, a difference between a compression bit rate corresponding to the encoded data and the target compression bit rate falls within a preset range.

Optionally, the M second feature values are obtained by separately performing a multiplication operation on the M target gain values and the corresponding first feature values.

Optionally, the at least one first feature map includes a first target feature map, the first target feature map includes P first feature values, all of the P first feature values correspond to a same target gain value, and P is a positive integer less than or equal to M.

Optionally, the apparatus further includes:
a determining module, configured to determine, based on a target mapping relationship, the M target gain values corresponding to the target compression bit rate, where the target mapping relationship is used to indicate an association relationship between a compression bit rate and M target gain values, where the target mapping relationship includes a plurality of compression bit rates, a plurality of gain vectors, and association relationships between the plurality of compression bit rates and the plurality of gain vectors, the target compression bit rate is one of the plurality of compression bit rates, and the M target gain values are elements of one of the plurality of gain vectors; or the target mapping relationship includes a target function mapping relationship, and when an input of the target function relationship includes the target compression bit rate, an output of the target function relationship includes the M target gain values.

Optionally, the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values.

Optionally, the M first gain values include a first target gain value, the M second gain values include a second target gain value, the M target gain values include a third target gain value, the first target gain value, the second target gain value, and the third target gain value correspond to a same one of the M first feature values, and the third target gain value is obtained by performing an interpolation operation on the first target gain value and the second target gain value.

Optionally, the first image includes a target object, and the M first feature values are feature values that are in the at least one feature map and that correspond to the target object.

Optionally, each of the M target gain values corresponds to one reverse gain value, the reverse gain value is used to process a feature value obtained in a decoding process of the encoded data, and a product of each of the M target gain values and the corresponding reverse gain value falls within a preset range.

Optionally, the apparatus further includes:
a decoding module, configured to perform entropy decoding on the encoded data to obtain at least one second feature map, where the at least one second feature map includes N third feature values, and each third feature value corresponds to one first feature value;
the obtaining module is further configured to obtain M target reverse gain values, where each target reverse gain value corresponds to one third feature value; and
the apparatus further includes:
a reverse gain module, configured to respectively perform gain processing on corresponding third feature values based on the M target reverse gain values, to obtain M fourth feature values; and
a reconstruction module, configured to perform image reconstruction on at least one second feature map obtained after the reverse gain processing, to obtain a second image, where the at least one second feature map obtained after the reverse gain processing includes the M fourth feature values.

Optionally, the M fourth feature values are obtained by separately performing a multiplication operation on the M target reverse gain values and the corresponding third feature values.

Optionally, the at least one second feature map includes a second target feature map, the second target feature map includes P third feature values, all of the P third feature values correspond to a same target reverse gain value, and P is a positive integer less than or equal to M.

Optionally, the determining module is further configured to:
determine, based on a target mapping relationship, the M target reverse gain values corresponding to the target compression bit rate, where the target mapping relationship is used to indicate an association relationship between a compression bit rate and a reverse gain vector.

Optionally, the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors.

Optionally, the target mapping relationship includes a target function mapping relationship, and when an input of the target function relationship includes the target compression bit rate, an output of the target function relationship includes the M target reverse gain values.

Optionally, the second image includes a target object, and the M third feature values are feature values that are in the at least one feature map and that correspond to the target object.

Optionally, a product of each of the M target gain values and a corresponding target reverse gain value falls within a preset range.

Optionally, the target compression bit rate is greater than the first compression bit rate and less than the second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

Optionally, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

This embodiment of this application provides the image processing apparatus 1400. The obtaining module 1401 obtains the first image. The feature extraction module 1402 performs feature extraction on the first image to obtain the at least one first feature map, where the at least one first feature map includes the N first feature values, and N is a positive integer. The obtaining module 1401 obtains the target compression bit rate, where the target compression bit rate corresponds to the M target gain values, each target gain value corresponds to one first feature value, and M is a positive integer less than or equal to N. The gain module 1403 processes the corresponding first feature values based on the M target gain values to obtain the M second feature values. The quantization and entropy encoding module 1404 performs quantization and entropy encoding on the at least one processed first feature map to obtain the encoded data, where the at least one processed first feature map includes the M second feature values. In the foregoing manner, different target gain values are set for different target compression bit rates, to implement compression bit rate control.

Figure 15:
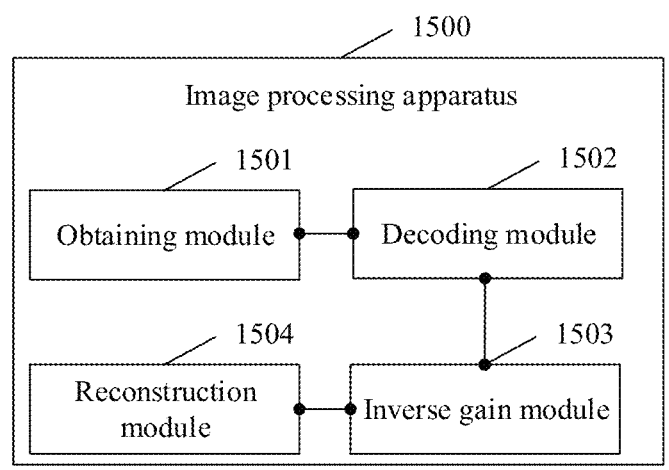
FIG. 15 is a schematic diagram of a structure of an image processing apparatus according to an embodiment of this application.

FIG. 15 is a schematic diagram of a structure of an image processing apparatus 1500 according to an embodiment of this application. The image processing apparatus 1500 may be a terminal device or a server, and the image processing apparatus 1500 includes:
an obtaining module 1501, configured to obtain encoded data;
a decoding module 1502, configured to perform entropy decoding on the encoded data to obtain at least one second feature map, where the at least one second feature map includes N third feature values, and N is a positive integer, where
the obtaining module 1501 is further configured to obtain M target reverse gain values, where each target reverse gain value corresponds to one third feature value, and M is a positive integer less than or equal to N;
a reverse gain module 1503, configured to respectively process corresponding third feature values based on the M target reverse gain values, to obtain M fourth feature values; and
a reconstruction module 1504, configured to perform image reconstruction on at least one processed second feature map to obtain a second image, where the at least one processed second feature map includes the M fourth feature values.

Optionally, the M fourth feature values are obtained by separately performing a multiplication operation on the M target reverse gain values and the corresponding third feature values.

Optionally, the at least one second feature map includes a second target feature map, the second target feature map includes P third feature values, all of the P third feature values correspond to a same target reverse gain value, and P is a positive integer less than or equal to M.

Optionally, the obtaining module is further configured to obtain a target compression bit rate; and the apparatus further includes:
  a determining module, configured to determine, based on a target mapping relationship, the M target reverse gain values corresponding to the target compression bit rate, where the target mapping relationship is used to indicate an association relationship between a compression bit rate and a reverse gain vector, where
  the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors; or
  the target mapping relationship includes a target function mapping relationship, and when an input of the target function relationship includes the target compression bit rate, an output of the target function relationship includes the M target reverse gain values.

Optionally, the second image includes a target object, and the M third feature values are feature values that are in the at least one feature map and that correspond to the target object.

Optionally, the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

Optionally, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

This embodiment of this application provides the image processing apparatus. The obtaining module 1501 obtains the encoded data. The decoding module 1502 performs entropy decoding on the encoded data to obtain the at least one second feature map, where the at least one second feature map includes the N third feature values, and N is a positive integer. The obtaining module 1501 obtains the M target reverse gain values, where each target reverse gain value corresponds to one third feature value, and M is a positive integer less than or equal to N. The reverse gain module 1503 respectively processes the corresponding third feature values based on the M target reverse gain values to obtain the M fourth feature values. The reconstruction module 1504 performs image reconstruction on the at least one processed second feature map to obtain the second image, where the at least one processed second feature map includes the M fourth feature values. In the foregoing manner, different target gain values are set for different target compression bit rates, to implement compression bit rate control.

Figure 16:
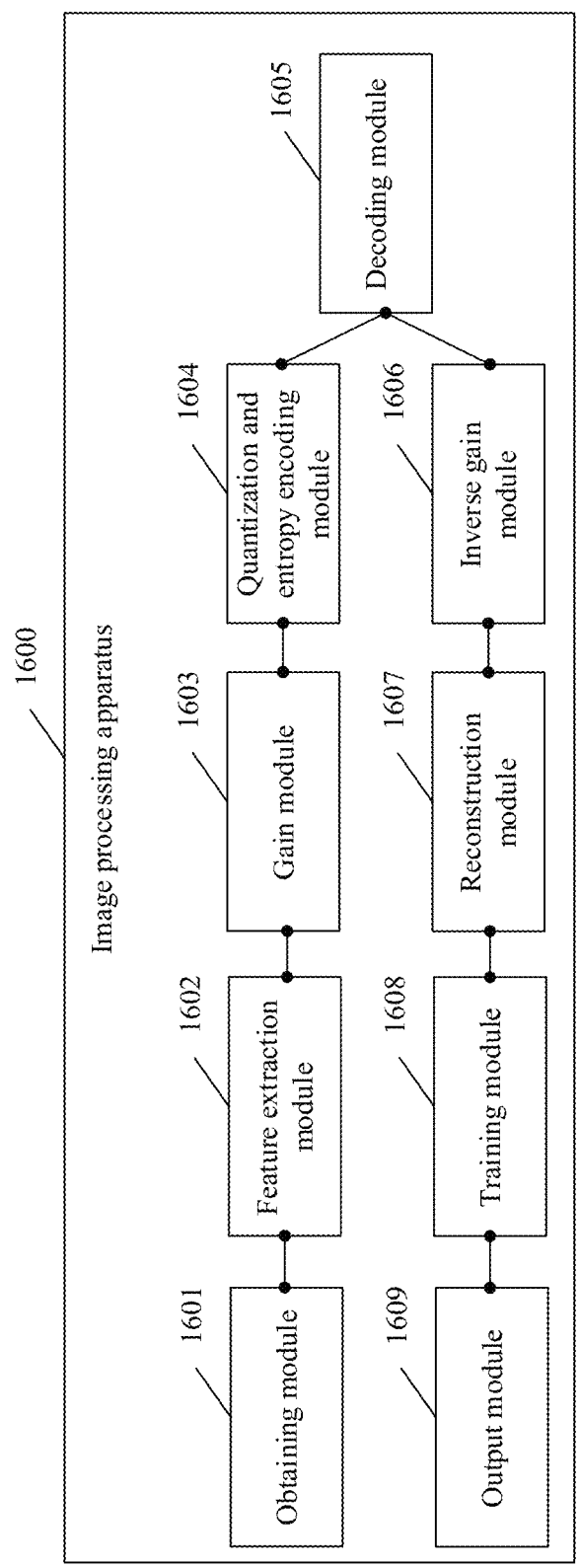
FIG. 16 is a schematic diagram of a structure of an image processing apparatus according to an embodiment of this application.

FIG. 16 is a schematic diagram of a structure of an image processing apparatus 1600 according to an embodiment of this application. The image processing apparatus 1600 may be a terminal device or a server, and the image processing apparatus 1600 includes:

an obtaining module 1601, configured to obtain a first image;
a feature extraction module 1602, configured to perform feature extraction on the first image based on an encoding network to obtain at least one first feature map, where the at least one first feature map includes N first feature values, and N is a positive integer, where
the obtaining module 1601 is further configured to obtain a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N;
a gain module 1603, configured to respectively process corresponding first feature values based on the M initial gain values to obtain M second feature values;
a quantization and entropy encoding module 1604, configured to perform quantization and entropy encoding on at least one processed first feature map based on a quantization network and an entropy encoding network to obtain encoded data and a bit rate loss, where the at least one first feature map obtained after the gain processing includes the M second feature values;
a decoding module 1605, configured to perform entropy decoding on the encoded data based on an entropy decoding network to obtain at least one second feature map, where the at least one second feature map includes M third feature values, and each third feature value corresponds to one first feature value;
a reverse gain module 1606, configured to respectively process the corresponding third feature values based on the M initial reverse gain values to obtain M fourth feature values;
a reconstruction module 1607, configured to perform image reconstruction on at least one processed second feature map based on a decoding network to obtain a second image, where the at least one processed feature map includes the M fourth feature values, where
the obtaining module 1601 is further configured to obtain a distortion loss of the second image relative to the first image;
a training module 1608, configured to perform joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network; and an output module 1609, configured to output a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

Optionally, information entropy of quantized data obtained after the at least one first feature map obtained after the gain processing is quantized meets a preset condition, the preset condition is related to the target compression bit rate, and N is a positive integer greater than or equal to M.

Optionally, the preset condition includes at least:
a larger target compression bit rate indicates larger information entropy of the quantized data.

Optionally, the M second feature values are obtained by separately performing a multiplication operation on the M target gain values and the corresponding first feature values.

Optionally, the at least one first feature map includes a first target feature map, the first target feature map includes P first feature values, all of the P first feature values correspond to a same target gain value, and P is a positive integer less than or equal to M.

Optionally, the first image includes a target object, and the M first feature values are feature values that are in the at least one feature map and that correspond to the target object.

Optionally, a product of each of the M target gain values and a corresponding target reverse gain value falls within a preset range, and a product of each of the M initial gain values and a corresponding initial reverse gain value falls within a preset range.

Figure 17:
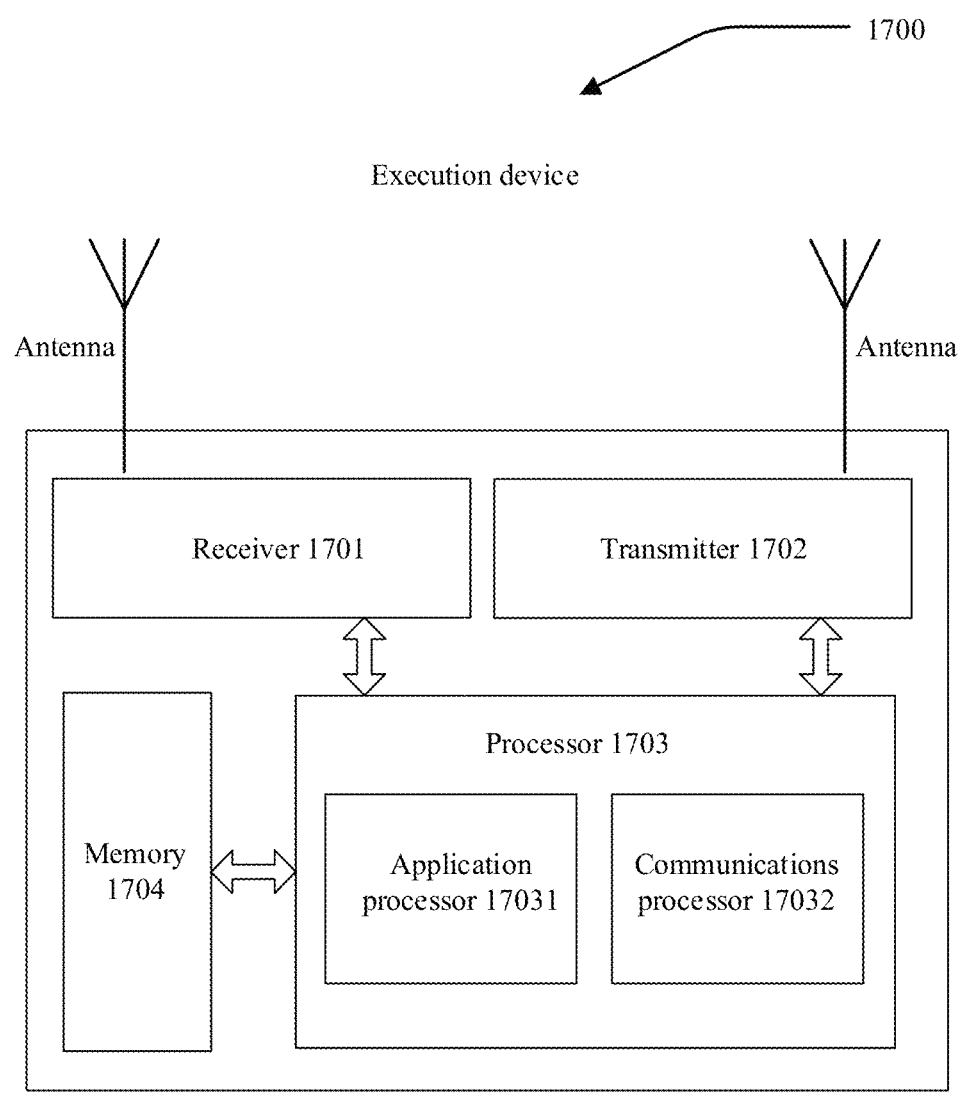
FIG. 17 is a schematic diagram of a structure of an execution device according to an embodiment of this application.

The following describes an execution device provided in an embodiment of this application. FIG. 17 is a schematic diagram of a structure of an execution device according to an embodiment of this application. An execution device 1700 may be specifically represented as a virtual reality (VR) device, a mobile phone, a tablet computer, a notebook computer, an intelligent wearable device, a monitoring data processing device, or the like. This is not limited herein. The image processing apparatuses described in the embodiments corresponding to FIG. 14 and FIG. 15 may be deployed in the execution device 1700 to implement the functions of the image processing apparatuses in the embodiments corresponding to FIG. 14 and FIG. 15. Specifically, the execution device 1700 includes a receiver 1701, a transmitter 1702, a processor 1703, and a memory 1704 (there may be one or more processors 1703 in the execution device 1700, and one processor is used as an example in FIG. 17). The processor 1703 may include an application processor 17031 and a communication processor 17032. In some embodiments of this application, the receiver 1701, the transmitter 1702, the processor 1703, and the memory 1704 may be connected by using a bus or in another manner.

The memory 1704 may include a read-only memory and a random access memory, and provide instructions and data for the processor 1703. A part of the memory 1704 may further include a non-volatile random access memory (NVRAM). The memory 1704 stores processor executable operation instructions, an executable module, a data structure, a subset thereof, or an extension set thereof. The operation instructions may include various operation instructions for implementing various operations.

The processor 1703 controls operations of the execution device. During a specific application, the components of the execution device are coupled together by using a bus system.

In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1703 or may be implemented by the processor 1703. The processor 1703 may be an integrated circuit chip and has a signal processing capability. In an implementation process, steps in the foregoing method can be implemented by using a hardware integrated logical circuit in the processor 1703, or by using instructions in a form of software. The processor 1703 may be a general-purpose processor, a digital signal processor (DSP), a microprocessor, or a microcontroller; or may further include an application-specific integrated circuit (ASIC), a field-programmable gate array (FPGA) or another programmable logic device, a discrete gate or transistor logic device, or a discrete hardware component. The processor 1703 may implement or perform the methods, steps, and logic block diagrams disclosed in embodiments of this application. The general-purpose processor may be a microprocessor, or the processor may be any conventional processor, or the like. The steps of the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1704, and the processor 1703 reads information in the memory 1704 and completes the steps in the foregoing methods in combination with hardware of the processor.

The receiver 1701 may be configured to: receive input digital or character information, and generate a signal input related to related setting and function control of the execution device. The transmitter 1702 may be configured to output digital or character information through a first interface. The transmitter 1702 may be further configured to send instructions to a disk group through the first interface, to modify data in the disk group. The transmitter 1702 may further include a display device such as a display screen.

In this embodiment of this application, in a case, the processor 1703 is configured to perform the image processing methods performed by the execution device in the embodiments corresponding to FIG. 9 to FIG. 11. Specifically, the application processor 17031 is configured to:
obtain a first image;
perform feature extraction on the first image to obtain at least one first feature map, where the at least one first feature map includes N first feature values, and N is a positive integer;
obtain a target compression bit rate, where the target compression bit rate corresponds to M target gain values, each target gain value corresponds to one first feature value, and M is a positive integer less than or equal to N;
respectively process corresponding first feature values based on the M target gain values to obtain M second feature values; and
perform quantization and entropy encoding on at least one processed first feature map to obtain encoded data, where the at least one processed first feature map includes the M second feature values.

Optionally, information entropy of quantized data obtained by quantizing the at least one processed first feature map meets a preset condition, and the preset condition is related to the target compression bit rate.

Optionally, the preset condition includes at least:

a larger target compression bit rate indicates larger information entropy of the quantized data.

Optionally, a difference between a compression bit rate corresponding to the encoded data and the target compression bit rate falls within a preset range.

Optionally, the M second feature values are obtained by separately performing a multiplication operation on the M target gain values and the corresponding first feature values.

Optionally, the at least one first feature map includes a first target feature map, the first target feature map includes P first feature values, all of the P first feature values correspond to a same target gain value, and P is a positive integer less than or equal to M.

Optionally, the application processor 17031 is further configured to:

determine, based on a target mapping relationship, the M target gain values corresponding to the target compression bit rate, where the target mapping relationship is used to indicate an association relationship between a compression bit rate and M target gain values, where the target mapping relationship includes a plurality of compression bit rates, a plurality of gain vectors, and association relationships between the plurality of compression bit rates and the plurality of gain vectors, the target compression bit rate is one of the plurality of compression bit rates, and the M target gain values are elements of one of the plurality of gain vectors; or the target mapping relationship includes a target function mapping relationship, and when an input of the target function relationship includes the target compression bit rate, an output of the target function relationship includes the M target gain values.

Optionally, the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values.

Optionally, the M first gain values include a first target gain value, the M second gain values include a second target gain value, the M target gain values include a third target gain value, the first target gain value, the second target gain value, and the third target gain value correspond to a same one of the M first feature values, and the third target gain value is obtained by performing an interpolation operation on the first target gain value and the second target gain value.

Optionally, the first image includes a target object, and the M first feature values are feature values that are in the at least one feature map and that correspond to the target object.

Optionally, each of the M target gain values corresponds to one reverse gain value, the reverse gain value is used to process a feature value obtained in a decoding process of the encoded data, and a product of each of the M target gain values and the corresponding reverse gain value falls within a preset range.

Optionally, the application processor 17031 is further configured to:

perform entropy decoding on the encoded data to obtain at least one second feature map, where the at least one second feature map includes N third feature values, and each third feature value corresponds to one first feature value; obtain M target reverse gain values, where each target reverse gain value corresponds to one third feature value; respectively perform gain processing on corresponding third feature values based on the M target reverse gain values to obtain M fourth feature values; and perform image reconstruction on at least one second feature map obtained after the reverse gain processing, to obtain a second image, where the at least one second feature map obtained after the reverse gain processing includes the M fourth feature values.

Optionally, the M fourth feature values are obtained by separately performing a multiplication operation on the M target reverse gain values and the corresponding third feature values.

Optionally, the at least one second feature map includes a second target feature map, the second target feature map includes P third feature values, all of the P third feature values correspond to a same target reverse gain value, and P is a positive integer less than or equal to M.

Optionally, the application processor 17031 is further configured to determine, based on a target mapping relationship, the M target reverse gain values corresponding to the target compression bit rate, where the target mapping relationship is used to indicate an association relationship between a compression bit rate and a reverse gain vector.

Optionally, the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors.

Optionally, the target mapping relationship includes a target function mapping relationship, and when an input of the target function relationship includes the target compression bit rate, an output of the target function relationship includes the M target reverse gain values.

Optionally, the second image includes a target object, and the M third feature values are feature values that are in the at least one feature map and that correspond to the target object.

Optionally, a product of each of the M target gain values and a corresponding target reverse gain value falls within a preset range.

Optionally, the target compression bit rate is greater than the first compression bit rate and less than the second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

Optionally, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first feature values, and the third target reverse gain value is obtained by performing an interpolation operation on the first target reverse gain value and the second target reverse gain value.

Specifically, the application processor 17031 is configured to:

obtain encoded data;

perform entropy decoding on the encoded data to obtain at least one second feature map, where the at least one second feature map includes N third feature values, and N is a positive integer;

obtain M target reverse gain values, where each target reverse gain value corresponds to one third feature value, and M is a positive integer less than or equal to N;

respectively process corresponding third feature values based on the M target reverse gain values, to obtain M fourth feature values; and perform image reconstruction on at least one processed second feature map to obtain a second image, where the at least one processed second feature map includes the M fourth feature values.

Optionally, the M fourth feature values are obtained by separately performing a multiplication operation on the M target reverse gain values and the corresponding third feature values.

Optionally, the at least one second feature map includes a second target feature map, the second target feature map includes P third feature values, all of the P third feature values correspond to a same target reverse gain value, and P is a positive integer less than or equal to M.

Optionally, the application processor 17031 is further configured to: obtain a target compression bit rate; and determine, based on a target mapping relationship, the M target reverse gain values corresponding to the target compression bit rate, where the target mapping relationship is used to indicate an association relationship between a compression bit rate and a reverse gain vector, where the target mapping relationship includes a plurality of compression bit rates, a plurality of reverse gain vectors, and association relationships between the plurality of compression bit rates and the plurality of reverse gain vectors, the target compression bit rate is one of the plurality of compression bit rates, and the M target reverse gain values are elements of one of the plurality of reverse gain vectors; or the target mapping relationship includes a target function mapping relationship, and when an input of the target function relationship includes the target compression bit rate, an output of the target function relationship includes the M target reverse gain values.

Optionally, the second image includes a target object, and the M third feature values are feature values that are in the at least one feature map and that correspond to the target object.

Optionally, the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

Optionally, the M first reverse gain values include a first target reverse gain value, the M second reverse gain values include a second target reverse gain value, the M target reverse gain values include a third target reverse gain value, the first target reverse gain value, the second target reverse gain value, and the third target reverse gain value correspond to a same one of the M first reverse gain values, and the third target reverse gain value is obtained by performing an interpolation operation on the first target reverse gain value and the second target reverse gain value.

Figure 18:
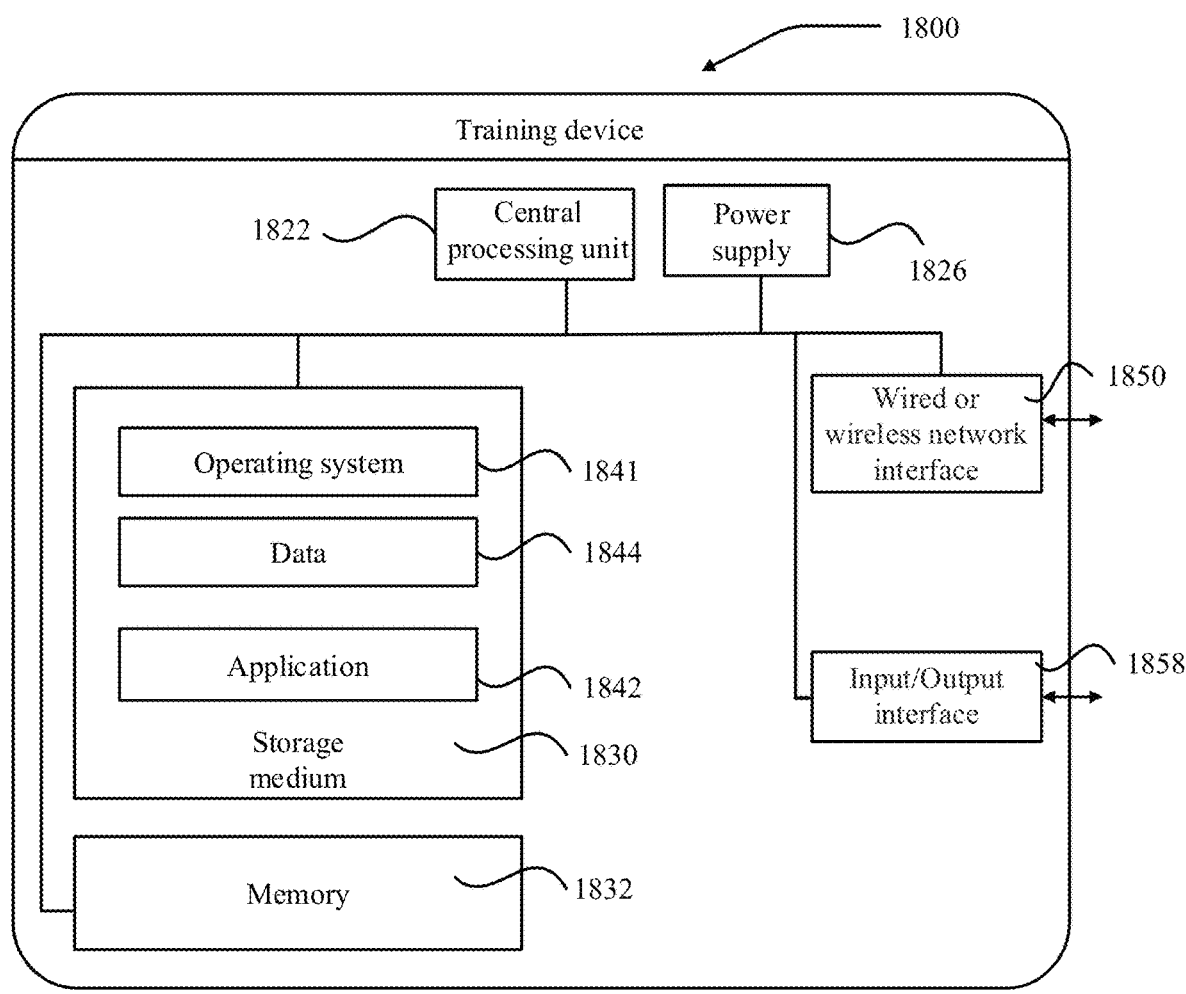
FIG. 18 is a schematic diagram of a structure of a training device according to an embodiment of this application.

An embodiment of this application further provides a training device. FIG. 18 is a schematic diagram of a structure of a training device according to an embodiment of this application. The image processing apparatus described in the embodiment corresponding to FIG. 16 may be deployed in a training device 1800 to implement the functions of the image processing apparatus in the embodiment corresponding to FIG. 16. Specifically, the training device 1800 is implemented by one or more servers. The training device 1800 may generate a relatively large difference due to different configurations or performance, and may include one or more central processing units (CPU) 1822 (for example, one or more processors), a memory 1832, and one or more storage media 1830 (for example, one or more mass storage devices) that store an application 1842 or data 1844. The memory 1832 and the storage medium 1830 may be transitory storages or persistent storages. A program stored in the storage medium 1830 may include at least one module (not shown in the figure), and each module may include a series of instruction operations for a training device. Further, the central processing unit 1822 may be disposed to communicate with the storage medium 1830, to perform, in the training device 1800, a series of instruction operations in the storage medium 1830.

The training device 1800 may further include one or more power supplies 1826, one or more wired or wireless network interfaces 1850, one or more input/output interfaces 1858, and/or one or more operating systems 1841, such as Windows Server™, Mac OS X™, Unix™, Linux™, or FreeBSD™.

In this embodiment of this application, the central processing unit 1822 is configured to perform the image processing method performed by the image processing apparatus in the embodiment corresponding to FIG. 16. Specifically, the central processing unit 1822 is configured to:

obtain a first image;

perform feature extraction on the first image based on an encoding network to obtain at least one first feature map, where the at least one first feature map includes N first feature values, and N is a positive integer;

obtain a target compression bit rate, where the target compression bit rate corresponds to M initial gain values and M initial reverse gain values, each initial gain value corresponds to one first feature value, each initial reverse gain value corresponds to one third feature value, and M is a positive integer less than or equal to N;

respectively process corresponding first feature values based on the M initial gain values to obtain M second feature values;

perform quantization and entropy encoding on at least one processed first feature map based on a quantization network and an entropy encoding network to obtain encoded data and a bit rate loss, where the at least one first feature map obtained after the gain processing includes the M second feature values;

perform entropy decoding on the encoded data based on an entropy decoding network to obtain at least one second feature map, where the at least one second feature map includes M third feature values, and each third feature value corresponds to one first feature value;

respectively process the corresponding third feature values based on the M initial reverse gain values to obtain M fourth feature values;

perform image reconstruction on at least one processed second feature map based on a decoding network to obtain a second image, where the at least one processed feature map includes the M fourth feature values;

obtain a distortion loss of the second image relative to the first image;

perform joint training on a first encoding/decoding network, the M initial gain values, and the M initial reverse gain values by using a loss function, until an image distortion value between the first image and the second image reaches a first preset degree, where the image distortion value is related to the bit rate loss and the distortion loss, and the encoding/decoding network includes the encoding network, the quantization network, the entropy encoding network, and the entropy decoding network; and output a second encoding/decoding network, M target gain values, and M target reverse gain values, where the second encoding/decoding network is a model obtained after iterative training is performed on the first encoding/decoding network, and the M target gain values and the M target reverse gain values are obtained after iterative training is performed on the M initial gain values and the M initial reverse gain values.

Optionally, information entropy of quantized data obtained by quantizing the at least one first feature map obtained after the gain processing meets a preset condition, and the preset condition is related to the target compression bit rate.

Optionally, the preset condition includes at least: a larger target compression bit rate indicates larger information entropy of the quantized data.

Optionally, the M second feature values are obtained by separately performing a multiplication operation on the M target gain values and the corresponding first feature values.

Optionally, the at least one first feature map includes a first target feature map, the first target feature map includes P first feature values, all of the P first feature values correspond to a same target gain value, and P is a positive integer less than or equal to M.

Optionally, the first image includes a target object, and the M first feature values are feature values that are in the at least one feature map and that correspond to the target object.

Optionally, a product of each of the M target gain values and a corresponding target reverse gain value falls within a preset range, and a product of each of the M initial gain values and a corresponding initial reverse gain value falls within a preset range.

An embodiment of this application further provides a computer program product. When the computer program product runs on a computer, the computer is enabled to perform the steps performed by the execution device in the methods described in the foregoing embodiment shown in FIG. 17, or the computer is enabled to perform the steps performed by the training device in the method described in the foregoing embodiment shown in FIG. 18.

An embodiment of this application further provides a computer-readable storage medium. The computer-readable storage medium stores a program used to perform signal processing. When the program runs on a computer, the computer is enabled to perform the steps performed by the execution device in the methods described in the foregoing embodiment shown in FIG. 17, or the computer is enabled to perform the steps performed by the training device in the method described in the foregoing embodiment shown in FIG. 18.

The execution device, the training device, or the terminal device provided in embodiments of this application may be specifically a chip. The chip includes a processing unit and a communication unit. The processing unit may be, for example, a processor. The communication unit may be, for example, an input/output interface, a pin, or a circuit. The processing unit may execute computer-executable instructions stored in a storage unit, to enable a chip in the execution device to perform the image processing methods described in the embodiments shown in FIG. 3 to FIG. 7, or enable a chip in the training device to perform the image processing method described in the embodiment shown in FIG. 13. Optionally, the storage unit is a storage unit in the chip, for example, a register or a cache. The storage unit may alternatively be a storage unit located outside the chip in a wireless access device end, for example, a read-only memory (ROM) or another type of static storage device that can store static information and instructions, or a random access memory (RAM).

Figure 19:
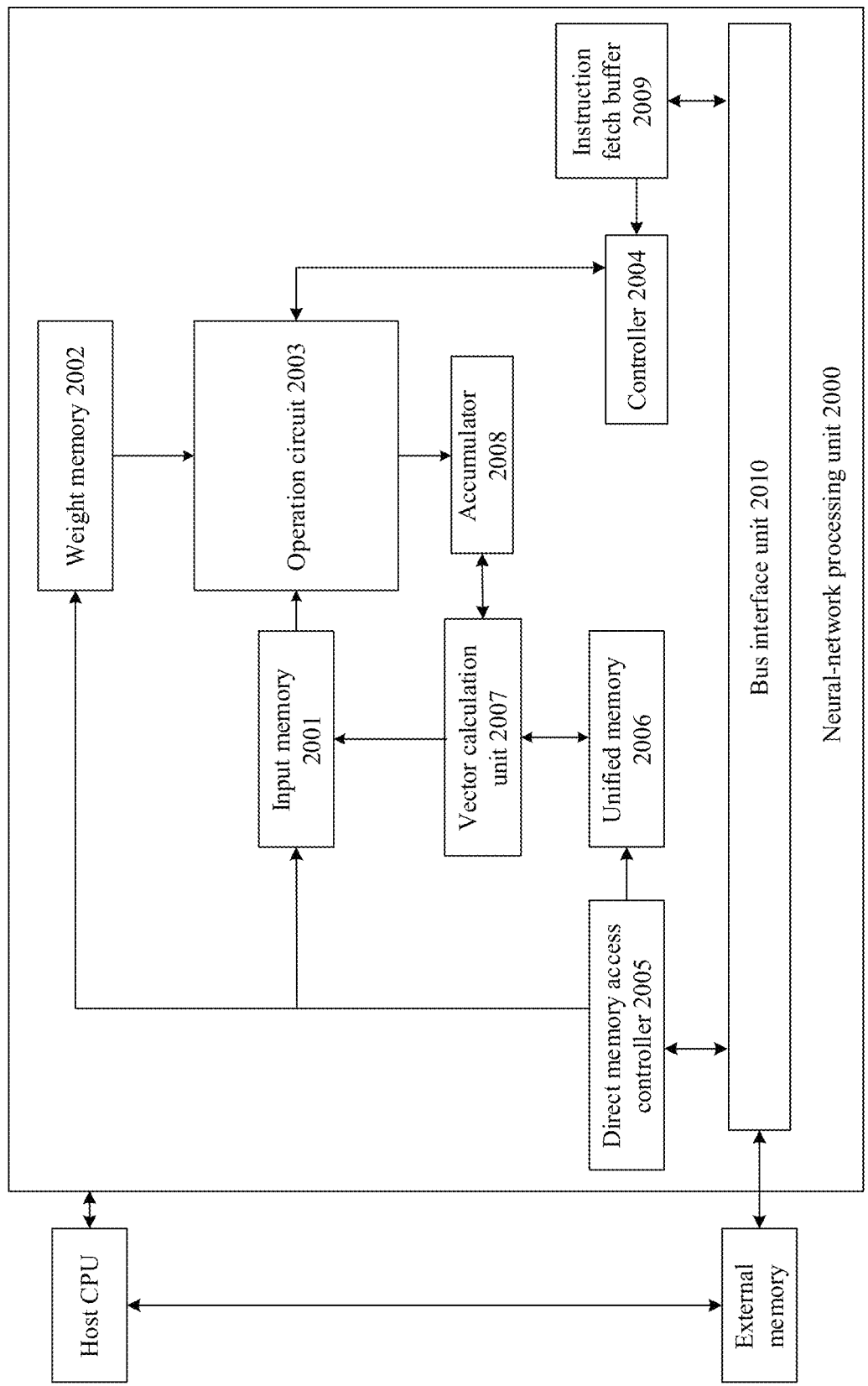
FIG. 19 is a schematic diagram of a structure of a chip according to an embodiment of this application.

For details, refer to FIG. 19. FIG. 19 is a schematic diagram of a structure of a chip according to an embodiment of this application. The chip may be represented as a neural-network processing unit NPU 2000. The NPU 2000 is mounted onto a host CPU as a coprocessor, and the host CPU allocates a task to the NPU. A core part of the NPU is an operation circuit 2003, and the operation circuit 2003 is controlled, by using the controller 2004, to extract matrix data from a memory and perform a multiplication operation.

In some implementations, the operation circuit 2003 includes a plurality of process engines (PE). In some implementations, the operation circuit 2003 is a two-dimensional systolic array. The operation circuit 2003 may alternatively be a one-dimensional systolic array or another electronic circuit capable of performing mathematical operations such as multiplication and addition. In some implementations, the operation circuit 2003 is a general-purpose matrix processor.

For example, it is assumed that there are an input matrix A, a weight matrix B, and an output matrix C. The operation circuit fetches corresponding data of the matrix B from a weight memory 2002, and buffers the data on each PE in the operation circuit. The operation circuit obtains data of the matrix A from the input memory 2001, performs a matrix operation on the data and the matrix B, and stores an obtained partial result or final result of the matrix in an accumulator 2008.

A unified memory 2006 is configured to store input data and output data. Weight data is directly transferred to the weight memory 2002 by using a direct memory access controller (DMAC) 2005. Input data is also transferred to the unified memory 2006 by using the DMAC.

BIU is Bus Interface Unit, namely, a bus interface unit 2010, configured to interact with the DMAC and an instruction fetch buffer (IFB) 2009 by using an AXI bus.

The bus interface unit 2010 (BIU) is configured for the instruction fetch buffer 2009 to obtain instructions from an external memory, and is further configured for the direct memory access controller 2005 to obtain raw data of the input matrix A or the weight matrix B from the external memory.

The DMAC is mainly configured to: transfer input data in an external memory DDR to the unified memory 2006, transfer the weight data to the weight memory 2002, or transfer the input data to the input memory 2001.

A vector calculation unit 2007 includes a plurality of operation processing units. When it is necessary, further processing is performed on an output of the operational circuit, such as vector multiplication, vector addition, an exponential operation, a logarithmic operation, or value comparison. The vector calculation unit 2007 is mainly configured to perform network computing, such as batch normalization, pixel-level summation, and upsampling of a feature plane, on a non-convolutional/fully-connected layer in a neural network.

In some implementations, the vector calculation unit 2007 can store a processed output vector in the unified memory 2006. For example, the vector calculation unit 2007 may apply a linear function and/or a non-linear function to the output of the operation circuit 2003, for example, perform linear interpolation on a feature plane extracted at a convolutional layer. For another example, the linear function and/or the non-linear function is applied to a vector of an accumulated value to generate an activation value. In some implementations, the vector calculation unit 2007 generates a normalized value, a pixel-level sum, or a normalized value and a pixel-level sum. In some implementations, the processed output vector can be used as an activated input to the operation circuit 2003, for example, the processed output vector can be used at a subsequent layer of the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private to a hardware architecture of the NPU.

The processor mentioned anywhere above may be a general-purpose central processing unit, a microprocessor, an ASIC, or one or more integrated circuits configured to control program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, or a dedicated circuit. However, in this application, a software program implementation is a better implementation in most cases. Based on such understanding, the technical solutions of this application essentially or the part contributing to the conventional technology may be implemented in a form of a software product. The software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk or a magnetic tape), an optical medium (for example, a DVD), a semiconductor medium (for example, a solid-state disk (SSD)), or the like.

What is claimed is:

1. An image processing method applied to an image processing device comprising one or more processors, the method comprising:
   obtaining a first image;
   performing feature extraction on the first image to obtain at least one first feature map, wherein the at least one first feature map comprises N first feature values, and N is a positive integer;
   obtaining a target compression bit rate;
   determining, based on a target mapping relationship, M target gain values corresponding to the target compression bit rate, wherein the target mapping relationship indicates an association relationship between a compression bit rate and M target gain values, each target gain value of the M target gain values corresponds to a first feature value of the N first feature values, and M is a positive integer less than or equal to N;
   respectively processing corresponding first feature values based on the M target gain values to obtain M second feature values; and
   performing quantization and entropy encoding on at least one processed first feature map to obtain encoded data, wherein the at least one processed first feature map comprises the M second feature values;
   wherein the target mapping relationship comprises a target function mapping relationship, and based on an input of the target function mapping relationship comprising the target compression bit rate, an output of the target function mapping relationship comprises the M target gain values.

2. The method according to claim 1, wherein information entropy of quantized data obtained by quantizing the at least one processed first feature map meets a preset condition, and the preset condition is related to the target compression bit rate.

3. The method according to claim 2, wherein the preset condition comprises at least:
a larger target compression bit rate indicates larger information entropy of the quantized data.

4. The method according to claim 1, wherein a difference between a compression bit rate corresponding to the encoded data and the target compression bit rate falls within a preset range.

5. The method according to claim 1, wherein the M second feature values are obtained by separately performing a multiplication operation on the M target gain values and the corresponding first feature values.

6. The method according to claim 1, wherein the at least one first feature map comprises a first target feature map, the first target feature map comprises P first feature values, all of the P first feature values correspond to a same target gain value of the M target gain values, and P is a positive integer less than or equal to M.

7. The method according to claim 1, wherein the target compression bit rate is greater than a first compression bit rate and less than a second compression bit rate, the first compression bit rate corresponds to M first gain values, the second compression bit rate corresponds to M second gain values, and the M target gain values are obtained by performing an interpolation operation on the M first gain values and the M second gain values.

8. The method according to claim 1, wherein the first image comprises a target object, and M first feature values are feature values that are in the at least one first feature map and that correspond to the target object.

9. The method according to claim 1, wherein each target gain value of the M target gain values corresponds to one reverse gain value, the reverse gain value is used to process a feature value obtained in a decoding process of the encoded data, and a product of each target gain value of the M target gain values and the corresponding reverse gain value falls within a preset range.

10. An image processing method applied to an image processing device comprising one or more processors, the method comprising:
obtaining encoded data;
performing entropy decoding on the encoded data to obtain at least one second feature map, wherein the at least one second feature map comprises N third feature values, and N is a positive integer;
obtaining a target compression bit rate;
determining, based on a target mapping relationship, M target reverse gain values corresponding to the target compression bit rate, wherein the target mapping relationship indicates an association relationship between a compression bit rate and a reverse gain vector, wherein each target reverse gain value of the M target reverse gain values corresponds to a third feature value of the N third feature values, and M is a positive integer less than or equal to N;
respectively processing corresponding third feature values based on the M target reverse gain values, to obtain M fourth feature values; and
performing image reconstruction on at least one processed second feature map to obtain a second image, wherein the at least one processed second feature map comprises the M fourth feature values,
wherein the target mapping relationship comprises a target function mapping relationship, and based on an input of the target function mapping relationship comprising the target compression bit rate, an output of the target function mapping relationship comprises the M target reverse gain values.

11. The method according to claim 10, wherein the M fourth feature values are obtained by separately performing a multiplication operation on the M target reverse gain values and the corresponding third feature values.

12. The method according to claim 10, wherein the at least one second feature map comprises a second target feature map, the second target feature map comprises P third feature values, all of the P third feature values correspond to a same target reverse gain value of the M target reverse gain values, and P is a positive integer less than or equal to M.

13. The method according to claim 10, wherein the second image comprises a target object, and M third feature values are feature values that are in the at least one second feature map and that correspond to the target object.

14. The method according to claim 10, wherein the target compression bit rate is greater than a first compression bit rate and less than a second compression bit rate, the first compression bit rate corresponds to M first reverse gain values, the second compression bit rate corresponds to M second reverse gain values, and the M target reverse gain values are obtained by performing an interpolation operation on the M first reverse gain values and the M second reverse gain values.

15. A device, comprising:
one or more processors;
a non-transitory computer-readable storage medium coupled to the one or more processors and storing instructions that, upon being executed by the one or more processors, cause the device to perform operations comprising:
obtaining a first image;
performing feature extraction on the first image to obtain at least one first feature map, wherein the at least one first feature map comprises N first feature values, and N is a positive integer;
obtaining a target compression bit rate;
determining, based on a target mapping relationship, M target gain values corresponding to the target compression bit rate, wherein the target mapping relationship indicates an association relationship between a compression bit rate and the M target gain values, each target gain value of the M target gain values corresponds to a first feature value of the N first feature values, and M is a positive integer less than or equal to N;
respectively processing corresponding first feature values based on the M target gain values to obtain M second feature values; and
performing quantization and entropy encoding on at least one processed first feature map to obtain encoded data, wherein the at least one processed first feature map comprises the M second feature values;
wherein the target mapping relationship comprises a target function mapping relationship, and based on an input of the target function mapping relationship comprising the target compression bit rate, an output of the target function mapping relationship comprises the M target gain values.

16. The device according to claim 15, wherein the M second feature values are obtained by separately performing a multiplication operation on the M target gain values and the corresponding first feature values.

17. The device according to claim 15, wherein the at least one first feature map comprises a first target feature map, the first target feature map comprises P first feature values, all of the P first feature values correspond to a same target gain value of the M target gain values, and P is a positive integer less than or equal to M.

* * * * *

UNITED STATES PATENT AND TRADEMARK OFFICE
CERTIFICATE OF CORRECTION

| | | |
|---|---|---|
| PATENT NO. | : 12,347,148 B2 | Page 1 of 1 |
| APPLICATION NO. | : 17/881432 | |
| DATED | : July 1, 2025 | |
| INVENTOR(S) | : Wang et al. | |

It is certified that error appears in the above-identified patent and that said Letters Patent is hereby corrected as shown below:

In the Claims

Claim 10: Column 52, Line 4: "prises the M fourth feature values," should read as -- prises the M fourth feature values; --.

Signed and Sealed this
Tenth Day of February, 2026

John A. Squires
*Director of the United States Patent and Trademark Office*